(12) United States Patent
Lu et al.

(10) Patent No.: US 11,627,072 B2
(45) Date of Patent: Apr. 11, 2023

(54) ROUTING ENTRY GENERATION METHOD AND APPARATUS AND TRIE GENERATION METHOD AND APPARATUS

(71) Applicant: HUAWEI TECHNOLOGIES CO., LTD., Shenzhen (CN)

(72) Inventors: Xiaogang Lu, Beijing (CN); Hongliang Gao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 140 days.

(21) Appl. No.: 16/989,578

(22) Filed: Aug. 10, 2020

(65) Prior Publication Data

US 2020/0374214 A1 Nov. 26, 2020

Related U.S. Application Data

(63) Continuation of application No. PCT/CN2019/110624, filed on Oct. 11, 2019.

(30) Foreign Application Priority Data

Oct. 12, 2018 (CN) .......................... 201811191267.8

(51) Int. Cl.
| | |
|---|---|
| *H04L 45/00* | (2022.01) |
| *H04L 45/24* | (2022.01) |
| *H04L 45/42* | (2022.01) |
| *H04L 45/745* | (2022.01) |
| *H04L 45/48* | (2022.01) |
| *H04L 49/25* | (2022.01) |

(52) U.S. Cl.
CPC .............. *H04L 45/22* (2013.01); *H04L 45/24* (2013.01); *H04L 45/42* (2013.01); *H04L 45/48* (2013.01); *H04L 45/54* (2013.01); *H04L 45/745* (2013.01); *H04L 49/25* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,519,733 B1 * | 4/2009 | Thubert | .................. | H04L 12/18 709/239 |
| 9,191,321 B2 * | 11/2015 | Goyal | .................. | G11C 7/1075 |
| 9,491,087 B1 | 11/2016 | Zhang et al. | | |

(Continued)

FOREIGN PATENT DOCUMENTS

| | | |
|---|---|---|
| CN | 101478551 A | 7/2009 |
| CN | 101969681 A | 2/2011 |

(Continued)

*Primary Examiner* — Xavier S Wong
(74) *Attorney, Agent, or Firm* — Huawei Technologies Co., Ltd.

(57) ABSTRACT

A routing entry generation method and apparatus and a trie generation method and apparatus, such that the routing entry generation method includes: obtaining M first routing entries, where each first routing entry includes a correspondence between a route and an outbound interface, and M≥2; and combining the M first routing entries to generate N second routing entries, where at least one of the N second routing entries includes a correspondence between a common route and an outbound interface, the common route is used to indicate two or more routes, N<M, and both N and M are integers.

14 Claims, 15 Drawing Sheets

(56) References Cited

U.S. PATENT DOCUMENTS

| | | | |
|---|---|---|---|
| 2005/0013308 A1 | 1/2005 | Wybenga et al. | |
| 2005/0232264 A1 | 10/2005 | Wybenga et al. | |
| 2009/0323589 A1* | 12/2009 | Mahany | H04W 40/24 370/328 |
| 2011/0202571 A1* | 8/2011 | Yan | H04L 45/745 707/797 |
| 2013/0024649 A1* | 1/2013 | Guo | H04L 45/54 711/E12.059 |
| 2013/0034096 A1* | 2/2013 | Hu | H04L 45/54 370/389 |
| 2015/0281055 A1 | 10/2015 | Lin et al. | |
| 2021/0092153 A1* | 3/2021 | Wei | H04L 45/64 |

FOREIGN PATENT DOCUMENTS

| | | |
|---|---|---|
| CN | 102055817 A | 5/2011 |
| CN | 102484610 A | 5/2012 |
| CN | 103401777 A | 11/2013 |
| CN | 103560963 A | 2/2014 |
| CN | 104618244 A | 5/2015 |
| CN | 105704040 A | 6/2016 |
| CN | 105939268 A | 9/2016 |
| CN | 106254244 A | 12/2016 |
| CN | 106446246 A | 2/2017 |
| CN | 106484865 A | 3/2017 |
| CN | 108322394 A | 7/2018 |
| EP | 2936786 A1 | 10/2015 |

\* cited by examiner

Tangential division

ROUTING ENTRY GENERATION METHOD AND APPARATUS AND TRIE GENERATION METHOD AND APPARATUS

CROSS-REFERENCE TO RELATED APPLICATIONS

This application is a continuation of International Application No. PCT/CN2019/110624, filed on Oct. 11, 2019, which claims priority to Chinese Patent Application No. 201811191267.8, filed on Oct. 12, 2018. The disclosures of the aforementioned applications are hereby incorporated by reference in their entireties.

TECHNICAL FIELD

Aspects of this application relate to the communications field, and in particular, to a routing entry generation method and apparatus and a trie generation method and apparatus.

BACKGROUND

A network device such as a router or a switch may support an internet protocol (IP) routing and forwarding function. The network device generally includes a main control board and a plurality of interface boards. The main control board mainly performs inter-network management, and is configured to: generate a routing information base (RIB) and a forwarding information base (FIB) table, and deliver the generated FIB table of the main control board to a hardware chip in each interface board. Each interface board is configured to forward an IP packet based on the FIB table delivered by the main control board.

In the prior art, when delivering the FIB table to the interface board, the main control board delivers the entire FIB table in the main control board to each interface board. Correspondingly, when receiving an IP packet, the interface board searches the FIB table for a routing entry that matches a destination address of the IP packet, and forwards the IP packet based on the matched routing entry.

With the continuous development of massive connections, for example, the development of the internet of things (IoT), a capacity of the FIB that needs to be learned and generated by the main control board becomes larger, and the FIB table needs to store a larger quantity of routes. Generally, routing entries learned by the main control board occupy a maximum of 4M storage space. In other words, 4 million routes are stored. Each route corresponds to one routing entry. Each routing entry includes content such as a destination address, a mask, a next-hop address, a shape description of to-be-forwarded information, and an outbound interface for forwarding. The hardware chip of the interface board (or a service board) has a limited capacity for storing the FIB table. Therefore, when the capacity of the FIB of the main control board is relatively large, for example, more than 4 million routes are stored, additional routes cannot be stored. As a result, a market requirement for a large-capacity FIB table cannot be met.

SUMMARY

To resolve a technical problem that a market requirement cannot be met because there are a large quantity of routing entries occupying storage space beyond a maximum storage capacity of a chip on an interface board, aspects of this application disclose the following technical solutions.

According to a first aspect, an embodiment of this application provides a routing entry generation method, including: obtaining, by a server, M first routing entries, where each first routing entry includes a correspondence between a route and an outbound interface, M≥2, and M is an integer; and combining the M first routing entries to generate N second routing entries, where at least one of the N second routing entries includes a correspondence between a common route and an outbound interface, the common route is used to indicate two or more routes, N<M, and N is an integer.

According to the method provided in this aspect, the M first routing entries are combined to generate the N second routing entries, at least one of the N second routing entries includes a common route, and the common route may replace at least two routes in the M first routing entries, so that a quantity of first routing entries is significantly reduced, storage space of routing entries is saved, and the saved storage space can be used to store additional routing entries, thereby meeting a market requirement for a large capacity.

With reference to the first aspect, in a possible implementation of the first aspect, the route in the first routing entry includes a destination address and a mask corresponding to the destination address, and both the destination address and the mask of the route are binary numbers; and the combining the M first routing entries to generate N second routing entries includes: obtaining a bit corresponding to each destination address of each route in the M first routing entries; and combining the M first routing entries based on a route set corresponding to an outbound interface with a largest quantity of routes and the bit corresponding to each destination address of each route, to generate the N second routing entries.

With reference to the first aspect, in another possible implementation of the first aspect, the process of combining the M first routing entries based on a route set corresponding to an outbound interface with a largest quantity of routes and the bit corresponding to each destination address of each route, to generate the N second routing entries includes:

configuring M routes in the M first routing entries on n vertices of a multi-dimensional space body, where M≤n; dividing the multi-dimensional space body based on the route set corresponding to the outbound interface with the largest quantity of routes in the M first routing entries and the bit corresponding to each destination address of each route until a first condition is met, to generate a plurality of low-dimensional space bodies, where the first condition is that all vertices in a plane of a low-dimensional space body obtained after the division are filled with routes having a same outbound interface, or there is no route in a low-dimensional space body obtained after the division; and combining all first routing entries that meet the first condition, to generate the N second routing entries.

With reference to the first aspect, in still another possible implementation of the first aspect, the dividing the multi-dimensional space body until a first condition is met, to generate a plurality of low-dimensional space bodies includes: determining a first plane of the multi-dimensional space body, where the first plane includes a largest quantity of routes having a same outbound interface; dividing the multi-dimensional space body based on a bit of a destination address of each route having the same outbound interface in the first plane, to form a first space body and a second space body; determining whether both the first space body and the second space body meet the first condition; and stopping the division if both meet the first condition, where the plurality of low-dimensional space bodies are the first space body and the second space body.

With reference to the first aspect, in still another possible implementation of the first aspect, the method further includes: if neither meets the first condition, further dividing the first space body and the second space body until all space bodies generated after the division meet the first condition, and generating the plurality of low-dimensional space bodies based on all the space bodies obtained after the division; and if a low-dimensional space body does not meet the first condition, dividing the space body that does not meet the first condition until the first condition is met, to obtain the plurality of low-dimensional space bodies.

According to a second aspect, an embodiment of this application provides a trie generation method, including: obtaining N second routing entries, where at least one of the N second routing entries includes a correspondence between a common route and an outbound interface, the common route is used to indicate two or more routes, the N second routing entries are generated by using M first routing entries, M≥2, N<M, and both N and M are integers; and each route in the first routing entries includes a destination address and a mask corresponding to the destination address, and both the destination address and the mask of each route are binary numbers; and the method further includes: obtaining at least one piece of indication information generated when the N second routing entries are generated by using the M first routing entries; and generating a trie based on destination addresses included in N routes in the N second routing entries and the at least one piece of indication information, where the trie includes a root node and at least one branch connected to the root node, each branch includes a plurality of leaf nodes, the root node and at least one leaf node are provided with the indication information, and the indication information is used to indicate a bit corresponding to a destination address of a next-layer branch of a node on which the indication information is located.

With reference to the second aspect, in a possible implementation of the second aspect, the generating a trie based on destination addresses included in N routes in the N second routing entries and the at least one piece of indication information includes: determining, based on the destination addresses included in the N routes, a bit corresponding to each character in the destination addresses; and configuring indication information used to indicate the bit corresponding to each character into a leaf node of an upper-layer branch or a root node that indicates a character of a destination address, to generate the trie.

According to the method provided in this aspect, a trie including a routing entry including a common route is generated. Compared with an existing trie including all characters, the trie has fewer branches and fewer nodes, so that a line card box or an interface board that performs a search can quickly find an outbound interface of a route without an off-chip memory, thereby reducing a forwarding delay.

According to a third aspect, an embodiment of this application provides a routing entry generation apparatus, configured to implement the routing entry generation method in the first aspect and the implementations of the first aspect.

Optionally, the apparatus includes at least one functional unit or module. Further, the at least one functional unit includes an obtaining unit, a generation unit, and the like.

Optionally, in a possible design, the apparatus may be a server or a main control board.

According to a fourth aspect, an embodiment of this application provides a trie generation apparatus, configured to implement the trie generation method in the second aspect and the implementations of the second aspect.

Optionally, the apparatus includes at least one functional unit or module. Further, the at least one functional unit includes an obtaining unit, a generation unit, and the like.

Optionally, in a possible design, the apparatus may be a line card box or an interface board.

According to a fifth aspect, an embodiment of this application further provides a routing entry query method. The method is used to query N second routing entries for an outbound interface of a route. Specifically, the method includes: obtaining at least one route, where each route is represented by using a binary character; performing search layer by layer for the binary character of each route based on indication information configured in each node in the trie until all binary characters in the route are traversed, and finding a last binary character; and determining an outbound interface of the current route based on an outbound interface associated with the found last character, where the binary character is "0" or "1".

According to the method provided in this aspect, based on a trie constructed by using a bit used during each space division, each character of a route is compared with indication information configured in a root node or a leaf node in the trie. For example, if the indication information stored in the root node of the trie indicates an $n^{th}$ bit, an $n^{th}$ bit of the searched route needs to be compared with information of two child nodes of the root node, and the search is performed layer by layer until all characters of the route are traversed, so that an outbound interface corresponding to each route can be quickly found, thereby improving search efficiency.

According to a sixth aspect, an embodiment of this application provides a routing entry query apparatus. The apparatus is configured to query a trie storing N second routing entries for an outbound interface of a route. Specifically, the apparatus is configured to implement the routing entry query method in the fifth aspect.

Optionally, the apparatus includes at least one functional unit or module. Further, the at least one functional unit includes an obtaining unit, a generation unit, and the like.

Optionally, in a possible design, the apparatus may be a line card box or an interface board.

According to a seventh aspect, an embodiment of this application provides a first device, including a transceiver, a processor, and a memory, where the transceiver is configured to obtain M first routing entries, where each first routing entry includes a correspondence between a route and an outbound interface, M≥2, and M is an integer; and the processor is configured to combine the M first routing entries to generate N second routing entries, where at least one of the N second routing entries includes a correspondence between a common route and an outbound interface, the common route is used to indicate two or more routes, N<M, and N is an integer.

With reference to the seventh aspect, in a possible implementation of the seventh aspect, the processor is specifically configured to obtain a bit corresponding to each destination address of each route in the M first routing entries; and combine the M first routing entries based on a route set corresponding to an outbound interface with a largest quantity of routes and the bit corresponding to each destination address of each route, to generate the N second routing entries. The route in the first routing entry includes a destination address and a mask corresponding to the destination address, and both the destination address and the mask of the route are binary numbers.

With reference to the seventh aspect, in another possible implementation of the seventh aspect, the processor is specifically configured to configure M routes in the M first routing entries on n vertices of a multi-dimensional space body, where M≤n; divide the multi-dimensional space body based on the route set corresponding to the outbound interface with the largest quantity of routes in the M first routing entries and the bit corresponding to each destination address of each route until a first condition is met, to generate a plurality of low-dimensional space bodies, where the first condition is that all vertices in a plane of a low-dimensional space body obtained after the division are filled with routes having a same outbound interface, or there is no route in a low-dimensional space body obtained after the division; and combine all first routing entries that meet the first condition, to generate the N second routing entries.

With reference to the seventh aspect, in still another possible implementation of the seventh aspect, the processor is specifically configured to determine a first plane of the multi-dimensional space body, where the first plane includes a largest quantity of routes having a same outbound interface; divide the multi-dimensional space body based on a bit of a destination address of each route having the same outbound interface in the first plane, to form a first space body and a second space body; determine whether both the first space body and the second space body meet the first condition; and stop the division if both meet the first condition, where the plurality of low-dimensional space bodies are the first space body and the second space body.

With reference to the seventh aspect, in still another possible implementation of the seventh aspect, the processor is further specifically configured to: if neither meets the first condition, further divide the first space body and the second space body until all space bodies generated after the division meet the first condition, and generate the plurality of low-dimensional space bodies based on all the space bodies obtained after the division; and if a low-dimensional space body does not meet the first condition, divide the space body that does not meet the first condition until the first condition is met, to obtain the plurality of low-dimensional space bodies.

Optionally, in a possible design, the first device may be a line card box or an interface board.

According to an eighth aspect, an embodiment of this application provides a second device, including a transceiver, a processor, and a memory, where the transceiver is configured to obtain N second routing entries, where at least one of the N second routing entries includes a correspondence between a common route and an outbound interface, the common route is used to indicate two or more routes, the N second routing entries are generated by using M first routing entries, M≥2, N<M, and both N and M are integers; and each route in the first routing entries includes a destination address and a mask corresponding to the destination address, and both the destination address and the mask of each route are binary numbers;

the transceiver is further configured to obtain at least one piece of indication information generated when the N second routing entries are generated by using the M first routing entries; and the processor is configured to generate a trie based on destination addresses included in N routes in the N second routing entries and the at least one piece of indication information, where the trie includes a root node and at least one branch connected to the root node, each branch includes a plurality of leaf nodes, the root node and at least one leaf node are provided with the indication information, and the indication information is used to indicate a bit corresponding to a destination address of a next-layer branch of a node on which the indication information is located.

With reference to the eighth aspect, in a possible implementation of the eighth aspect, the processor is specifically configured to determine, based on the destination addresses included in the N routes, a bit corresponding to each character in the destination addresses; and configure indication information used to indicate the bit corresponding to each character into a leaf node of an upper-layer branch or a root node that indicates a character of a destination address, to generate the trie.

In addition, the second device is further configured to implement all steps of the routing entry query method in the fifth aspect.

According to a ninth aspect, an embodiment of this application further provides a system, including the apparatus in the third aspect and the apparatus in the fourth aspect, or including the first device in the seventh aspect and the second device in the eighth aspect.

Optionally, the first device is a server or a main control board, and the second device is a line card box or an interface board.

Optionally, the system further includes the routing entry query apparatus in the sixth aspect.

According to a tenth aspect, an embodiment of this application further provides a computer storage medium, storing an instruction. When the instruction is run on a computer, some or all steps in the embodiments of the routing entry generation method and the trie generation method provided in this application may be implemented.

Optionally, in a possible implementation, running the instruction on the computer may further implement some or all steps in the embodiment of the routing entry query method provided in this application.

In addition, this application further provides a computer program product, including one or more computer instructions, for example, a routing entry generation instruction and a trie generation instruction. When the instruction is run on a computer, some or all steps in the embodiments of the routing entry generation method and the trie generation method provided in this application may be implemented.

Optionally, in a possible implementation, running the instruction on the computer may further implement some or all steps in the embodiment of the routing entry query method provided in this application.

According to the routing entry generation method provided in this application, the M first routing entries are combined to generate the N second routing entries, at least one of the N second routing entries includes a common route, and the common route may replace at least two routes in the M first routing entries, so that a quantity of first routing entries is significantly reduced, storage space of routing entries is saved, and the saved storage space can be used to store additional routing entries, thereby meeting a market requirement for a large capacity.

In addition, according to the trie generation method provided in this application, a trie including a routing entry including a common route is generated. Compared with an existing trie including all characters, the trie has fewer branches and fewer nodes, so that a line card box or an interface board that performs search can quickly find an outbound interface of a route without an off-chip memory, thereby reducing a forwarding delay.

DESCRIPTION OF EMBODIMENTS

Before technical solutions in embodiments of this application are described, a technical term and an application scenario in the embodiments of this application are first introduced and described.

The technical solutions of this application, applied to the communications field, may be applied to any networking environment in the communications field, for example, a scale-out networking architecture. The networking architecture includes at least one network device. The network device may be a device such as a switch or a router, for example, a PB (Peta ($10^{15}$)-Bit) router.

Figure 1:
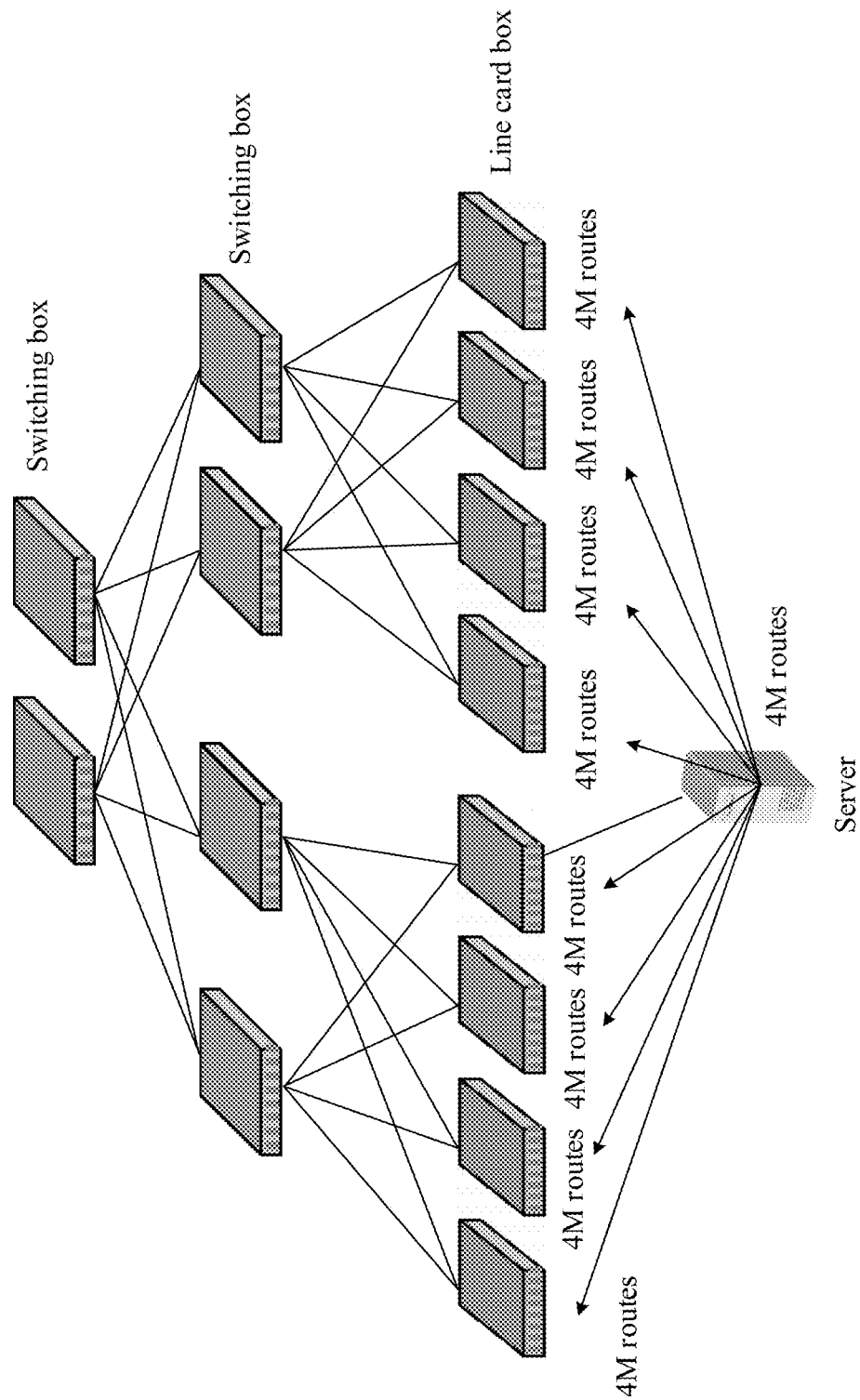
FIG. 1 is a schematic structural diagram of a router according to this application.

FIG. 1 shows a PB router. The router includes: a server, a plurality of line card boxes connected to the server, a switching box connected to each line card box, and the like. Each line card box is provided with a plurality of ports/outbound interfaces, to connect to the switching box or another network device, for example, a terminal.

Figure 2A:
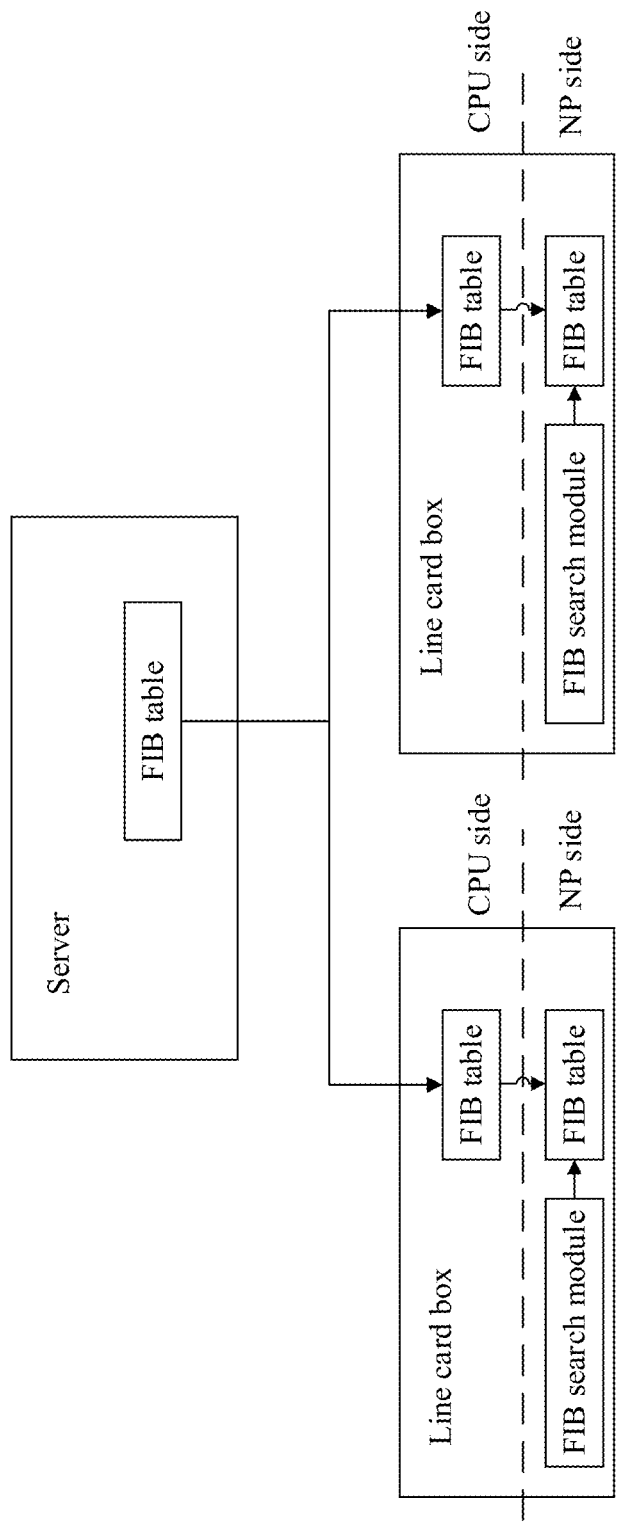
FIG. 2a is a schematic structural diagram of a peta-bit (PB) router according to an embodiment of this application.

For example, as shown in FIG. 2a, the server is a control apparatus of the PB router, and is configured to run IP protocols of different networks, learn routes, generate a forwarding information base (FIB) table, and forward the FIB table to each line card box.

Optionally, the server may be a general-purpose server.

Each line card box is configured to receive the FIB table from the server, store the FIB table in a hardware chip of the line card box, obtain next-hop information by querying the FIB table, and forward a packet. Further, each line card box has an independent central processing unit (CPU). The CPU forwards the FIB table to an internal network processor (NP). A FIB search module on an NP side determines, according to content of the obtained FIB table, a next-hop device to which the packet is forwarded.

Optionally, a quantity of line card boxes arranged may be increased or decreased based on a requirement, for example, a packet forwarding status.

The switching box may be used as a switching unit of the router to switch data packets.

Figure 2B:
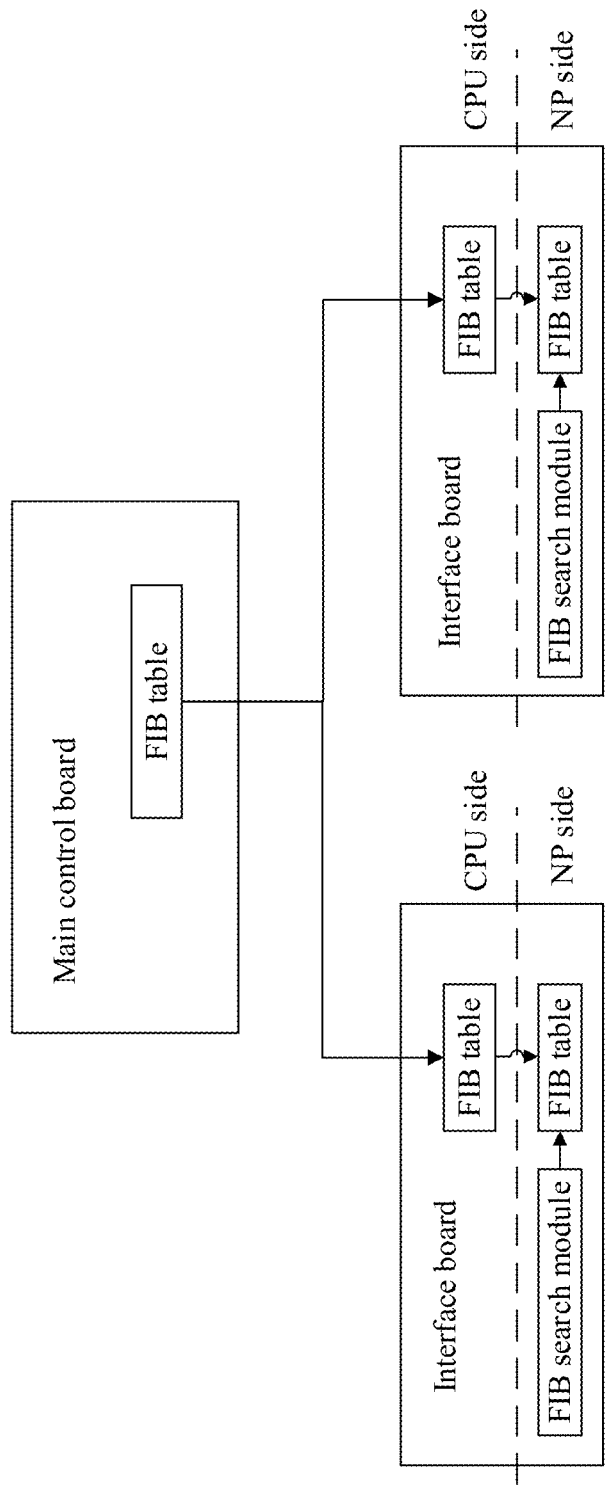
FIG. 2b is a schematic structural diagram of a frame-shaped router according to an embodiment of this application.

Referring to FIG. 2b, an embodiment of this application further provides a router, for example, a frame-shaped router. The frame-shaped router includes a main control board and an interface board. The interface board may also be referred to as a service board.

Each interface board has an independent CPU or NP for forwarding. The main control board belongs to a control layer of the router. The main control board obtains routing information through session exchange according to a routing protocol and generates a routing entry. The main control board stores the generated routing entry into a FIB table of the main control board, and delivers the FIB table to each interface board.

After receiving an IP packet, the interface board searches the FIB table for a routing entry that matches a destination address of the IP packet and forwards the IP packet based on the routing entry.

In addition, the embodiments of this application may further include other types of routers, and all these routers have functions of generating a FIB table and forwarding the FIB table to an interface board or a line card box, and functions of querying the FIB table and forwarding a packet or a data packet.

The following describes concepts such as a FIB table and a routing entry in the embodiments of this application.

The routing entry is an entry used to indicate a router to forward traffic such as a data packet or an IP packet. Each routing entry includes a correspondence between a route and an outbound interface. The route includes information such as a destination address/mask, a next-hop address, a flag, and a timestamp, as shown in Table 1.

TABLE 1

|  | Destination/Mask destination address/mask | Nexthop next-hop address | Flag flag | Interface outbound interface for forwarding |
|---|---|---|---|---|
| Routing entry 1 | 10.153.17.0/24 | 10.153.17.99 | G gateway route | Vian-interface1 |
| Routing entry 2 | 10.153.18.88/32 | 127.0.0.1 | H local host route | InLoopBack0 |

Table 1 shows a FIB table in an embodiment. The FIB table includes two routing entries. Further, the routing entry 1 includes a correspondence between a route and the outbound interface "Vian-interface1", and the routing entry 2 includes a correspondence between another route and the outbound interface "InLoopBack0". The correspondences between the routes and the outbound interfaces and content, such as a destination address/mask and a next-hop address, carried by each route may be preset.

Optionally, the server or the main control board may obtain a large quantity of routes from outside through learning by using a routing protocol or from a local static configuration, and then extract active routes to form a FIB table.

Optionally, the server or the main control board may broadcast the FIB table to the line card box by using a data packet or an IP packet.

Figure 3:
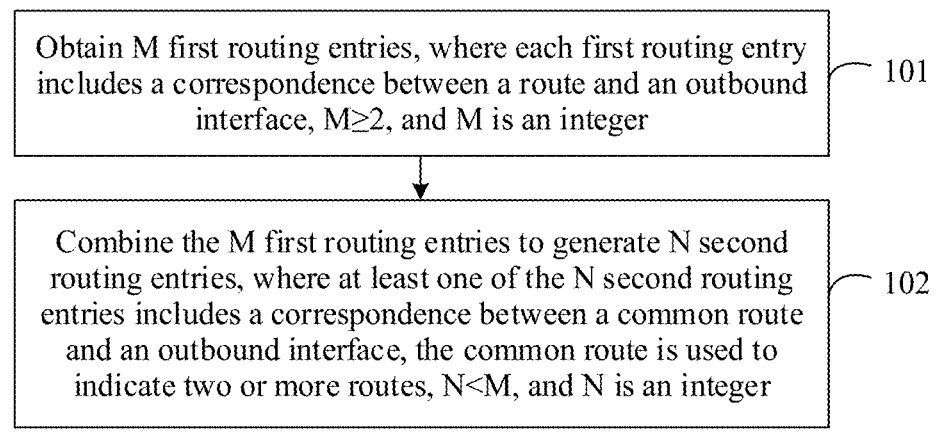
FIG. 3 is a flowchart of a routing entry generation method according to an embodiment of this application.

As shown in FIG. 3, an embodiment of this application provides a routing entry generation method, including the following steps.

Step 101: Obtain M first routing entries, where each first routing entry includes a correspondence between a route and an outbound interface, M≥2, and M is a positive integer.

Each route in each first routing entry includes a destination address and a mask corresponding to the destination address, and both the destination address and the mask of each route are binary numbers. For example, a destination address/mask of a route is 000/111. In addition, a quantity of bits in the destination address is the same as a quantity of bits in the mask.

In the embodiments of this application, both a destination address and a mask are represented by using binary 0/1, and a quantity of destination addresses represented by using binary is the same as a quantity of masks represented by using binary. For example, binary "1" and "0" of the mask are set to indicate a degree of concern for the destination address. If a mask corresponding to a destination address is "1", it indicates that content of the destination address is concerned. If a mask is 0, it indicates that content of a destination address is unconcerned.

For example, a route (a routing entry) includes: a destination address is 10101100, a corresponding mask is 11111100, and last two bits "00" of the mask indicate that content, corresponding to the last two bits, of the destination address is unconcerned. In this embodiment, an unconcerned address may be replaced with "*". In this case, the destination address of the route may be expressed as 101011**. If a mask corresponding to a destination address of a route includes only 1, it indicates that all content of the destination address of the route is concerned. In this case, the destination address remains unchanged and is written as 10101101.

In this embodiment, only concerned content of a destination address is retained, and unconcerned content of the destination address is replaced with "*", to reduce a search time and avoid traversing all destination addresses.

Step 102: Combine the M first routing entries to generate N second routing entries, where at least one of the N second routing entries includes a correspondence between a common route and an outbound interface, the common route is used to indicate two or more routes, N<M, and N is a positive integer.

Optionally, the common route includes a common destination address, and the common destination address may be used to indicate IP addresses of two or more routes and share a same mask.

For example, as shown in Table 2, a common route in a generated second routing entry includes a common destination address "0**" and a mask "100", and there is a correspondence between the common route and an outbound interface 2.

TABLE 2

|  | IP address/Mask | Outbound interface |
|---|---|---|
| Network device 1<br>Network device 2 | 0**/100 | 2 |

For example, a server or a main control board sends the generated N second routing entries to each line card box by using a FIB table.

According to the method provided in this embodiment, the M first routing entries are combined to generate the N second routing entries, at least one of the N second routing entries includes a common route, and the common route may replace at least two routes in the M first routing entries, so that a quantity of first routing entries is significantly reduced, storage space is saved, and the saved storage space can be used to store additional routing entries, thereby meeting a market requirement for a large capacity.

Figure 4:
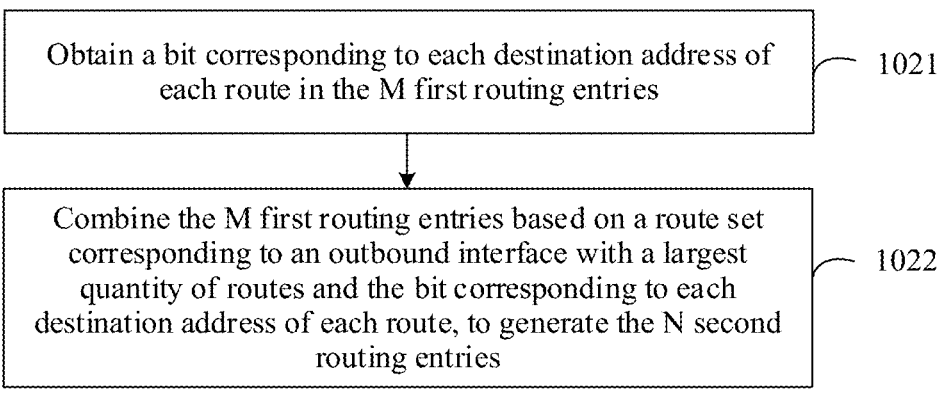
FIG. 4 is a flowchart of another routing entry generation method according to an embodiment of this application.

Optionally, in a specific implementation of this embodiment, as shown in FIG. 4, step 102 specifically includes the following steps.

Step 1021: Obtain a bit corresponding to each destination address of each route in the M first routing entries.

The route in the first routing entry includes a destination address and a mask corresponding to the destination address, and both the destination address and the mask of each route are binary numbers. For example, a routing entry includes a destination IP address/mask represented as 000/111. 000 of the destination IP address are sorted in a bit sequence: a first bit, a second bit, and a third bit.

For example, if a first routing entry is "route 000 corresponding to outbound interface 2", obtaining a bit of the route includes: obtaining a first bit "0", a second bit "0", and a third bit "0" of the route 000.

Step 1022: Combine the M first routing entries based on a route set corresponding to an outbound interface with a largest quantity of routes and the bit corresponding to each destination address of each route, to generate the N second routing entries.

Specifically, step 1022 includes the following steps.

(1) Configure M routes in the M first routing entries on n vertices of a multi-dimensional space body, where M≤n, and n is a positive integer.

(2) Divide the multi-dimensional space body based on the route set corresponding to the outbound interface with the largest quantity of routes in the M first routing entries and the bit corresponding to each destination address of each route until a first condition is met, to generate a plurality of low-dimensional space bodies.

The first condition is that all vertices in a plane of a low-dimensional space body obtained after the division are filled with routes having a same outbound interface, or there is no route in a low-dimensional space body obtained after the division.

Further, the process includes: determining a first plane of the multi-dimensional space body, where the first plane includes a largest quantity of routes having a same outbound interface; dividing the multi-dimensional space body based on a bit of a destination address of each route having the same outbound interface in the first plane, to form a first space body and a second space body; and determining whether both the first space body and the second space body meet the first condition.

The division is stopped if both meet the first condition. The plurality of low-dimensional space bodies are the first space body and the second space body.

If neither meets the first condition, the first space body and the second space body are further divided until all space bodies generated after the division meet the first condition, and the plurality of low-dimensional space bodies are obtained based on all the space bodies obtained after the division.

If a low-dimensional space body does not meet the first condition, the space body that does not meet the first condition is divided until the first condition is met, to obtain the plurality of low-dimensional space bodies.

(3) Combine all first routing entries that meet the first condition, to generate the N second routing entries.

For example, all first routing entries that meet a first element of the first condition are combined. The first element of the first condition is that all vertices in a plane of a low-dimensional space body obtained after the division are filled with routes having a same outbound interface.

Alternatively, all the first routing entries except that meets a second element of the first condition are combined. The second element of the first condition is that there is no route in a low-dimensional space body obtained after the division. In this way, the low-dimensional space body having no route after the division does not participate in combination and generation of a second routing entry.

In this embodiment of this application, a route is represented by using binary, and each route is represented by using 3 bits, 6 bits, 8 bits, or the like. An IPv4 route has 32 bits. Unconcerned content in an IP address of a route may be directly replaced with "*". For example, a route 10101100 corresponding to a mask 11111100 may be directly written as 101011**.

For ease of description, in this embodiment, that a route has 3 bits is used as an example for description. For example, a first routing entry set is 000, 001, 010, 011, 100, and 110, and masks corresponding to all IP addresses in the first routing entry set indicate concerned. A correspondence between a route and an outbound interface is obtained in each first routing entry. Specific relationships are as follows:
  route 000 corresponding to outbound interface 2;
  route 001 corresponding to outbound interface 2;
  route 010 corresponding to outbound interface 2;
  route 011 corresponding to outbound interface 2;
  route 100 corresponding to outbound interface 2;
  route 110 corresponding to outbound interface 2; and
  route 101 corresponding to outbound interface 1.

Figure 5A:
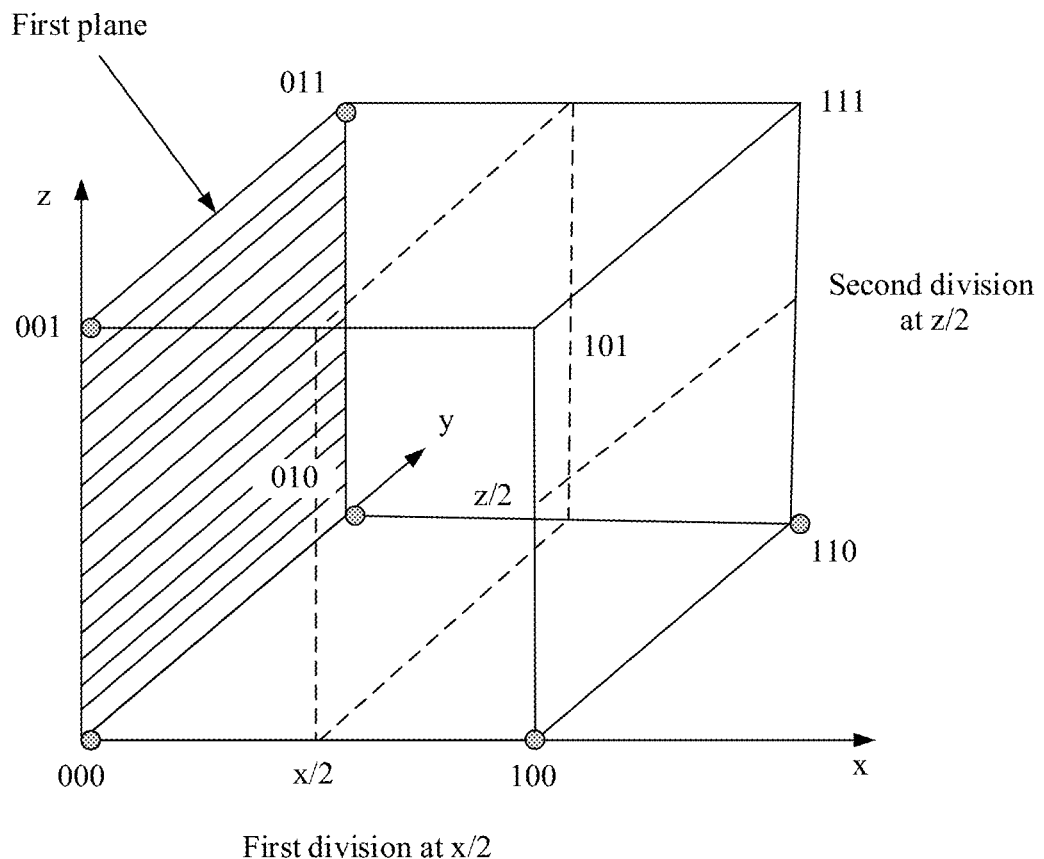
FIG. 5a is a schematic diagram of an axial division of a three-dimensional space body according to an embodiment of this application.

The seven routes are configured on vertices of an n-dimensional space body of space. As shown in FIG. 5a, a three-dimensional space body with x, y, and z coordinate axes is established. Then, the routes 000, 001, 010, 011, 100, and 110 are configured on vertices of the three-dimensional space body. Referring to circular vertices in FIG. 5a, each circular vertex is provided with one route.

In this embodiment of this application, routes having a same outbound interface may be combined into a common route by using a dimension-reduced combination algorithm, so that a plurality of original first routing entries are combined into a few second routing entries, to reduce a quantity of routing entries, thereby saving space for storing the FIB table.

A main process of the dimension-reduced combination algorithm includes: forming a routing space by using an established n-dimensional space body whose vertices are provided with routes, and dividing the routing space. Two n−1-dimensional space bodies are generated after each division. Different division modes are selected based on spatial distribution of routes. For example, after the division, routes having a same outbound interface are retained in a same n−1-dimensional space as far as possible. Then, the n−1-dimensional space bodies are further divided to reduce dimensions until all vertices in a plane of a low-dimensional space body obtained after the division are filled with routes and the routes have a same outbound interface, or there is no route in a low-dimensional space body after the division. A key point of the algorithm is to select an n-dimensional space body division mode to reduce the dimensions of the n-dimensional space body and finally perform combination based on a same outbound interface. Therefore, the algorithm is referred to as the dimension-reduced combination algorithm.

It should be noted that the n-dimensional space body and the n−1-dimensional space body in this embodiment of this application are geometric shapes or geometric space bodies including routing vertices. For example, a three-dimensional space body including eight vertices is used as an example. As shown in FIG. 5a, after a first division, two geometric space bodies are obtained, each of the two geometric space bodies includes four routing vertices, and the four routing vertices are located in one plane. Therefore, compared with the original three-dimensional space body including eight routing vertices, each geometric space body obtained after the division is a two-dimensional space body. Therefore, a plane including four vertices that is obtained after the original three-dimensional space body is divided once is referred to as a two-dimensional space body. In other words, an n−1-dimensional space body is formed after an n-dimensional space body is divided.

Similarly, the space body in the plane is further divided, to obtain a one-dimensional point including one routing vertex or a one-dimensional line segment including two routing vertices. Therefore, a one-dimensional space body including one or two routing vertices is formed after the space body in the plane including four vertices is further divided.

In a possible design, as shown in FIG. 5a, a specific process of performing division and dimension reduction on a three-dimensional space body based on a dimension-reduced combination algorithm includes the following steps.

S1: Select an outbound interface with a largest quantity of routes.

S2: Determine a plane that includes a largest quantity of routes having a same outbound interface, for example, a first plane. The first plane includes four routing vertices 000, 001, 011, and 010. The n-dimensional space body is divided into two n−1-dimensional space bodies based on a first bit at an axial position corresponding to the first plane. Because the division is performed based on the first bit of a destination address, in other words, content of the first bit is concerned while content of other bits is unconcerned, the unconcerned bits may be represented by using "0", and after the division is based on the first bit, the mask is changed to 100.

In FIG. 5a, the outbound interface 2 corresponds to a largest quantity of routes, the first plane including the four vertices of the routes "000, 001, 011, 010" corresponds to the same outbound interface, and based on the first condition that all vertices in a plane of a low-dimensional space body obtained after the division are filled with routes and the routes have a same outbound interface, the three-dimensional space body is divided at an axis of a midpoint x/2 of the routes 000 and 100, to generate two space bodies, for example, a space 0 and a space 1.

Figure 6A:
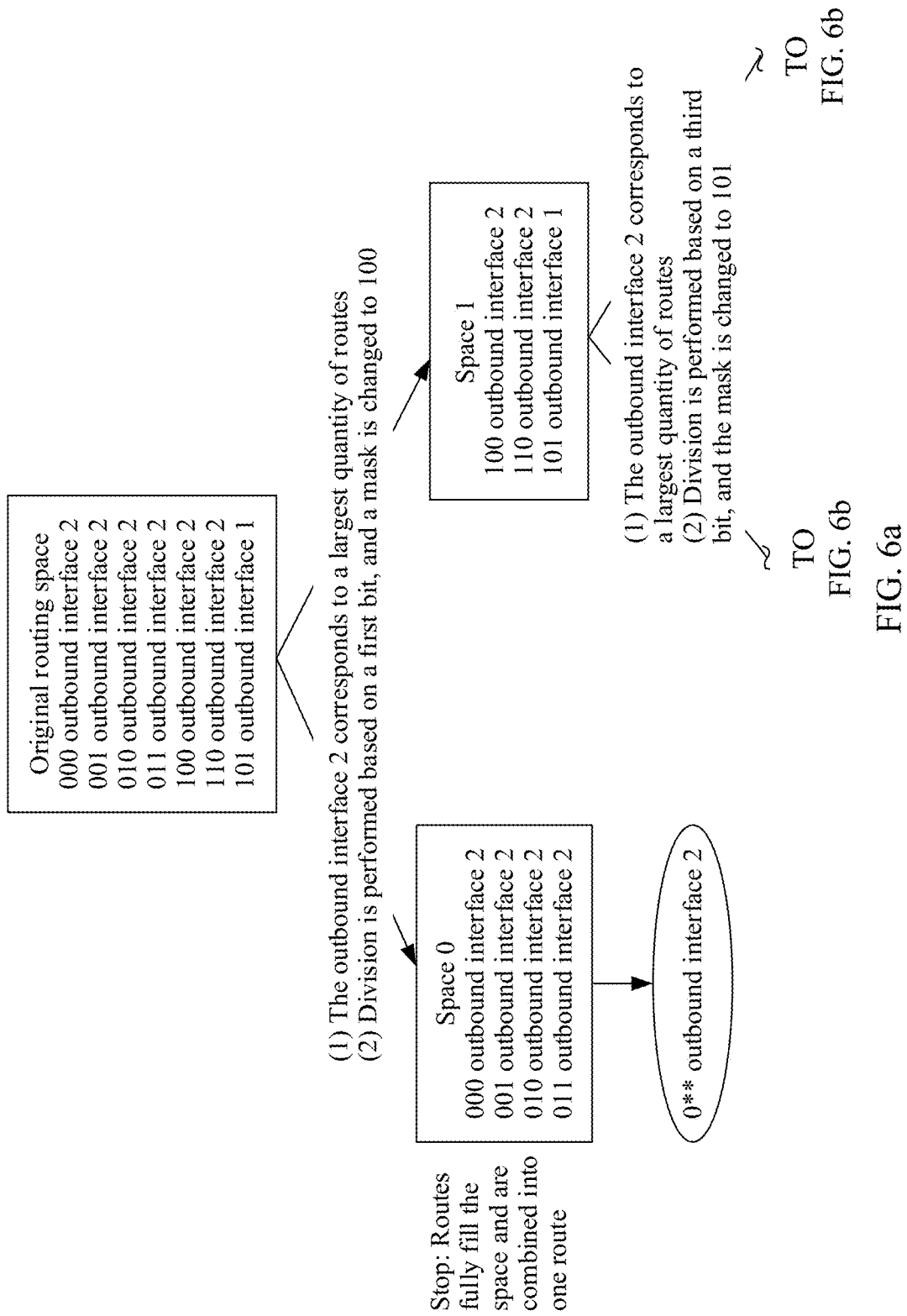
FIG. 6a and FIG. 6b are a schematic diagram of routing entry generation according to an embodiment of this application.
Figure 6B:
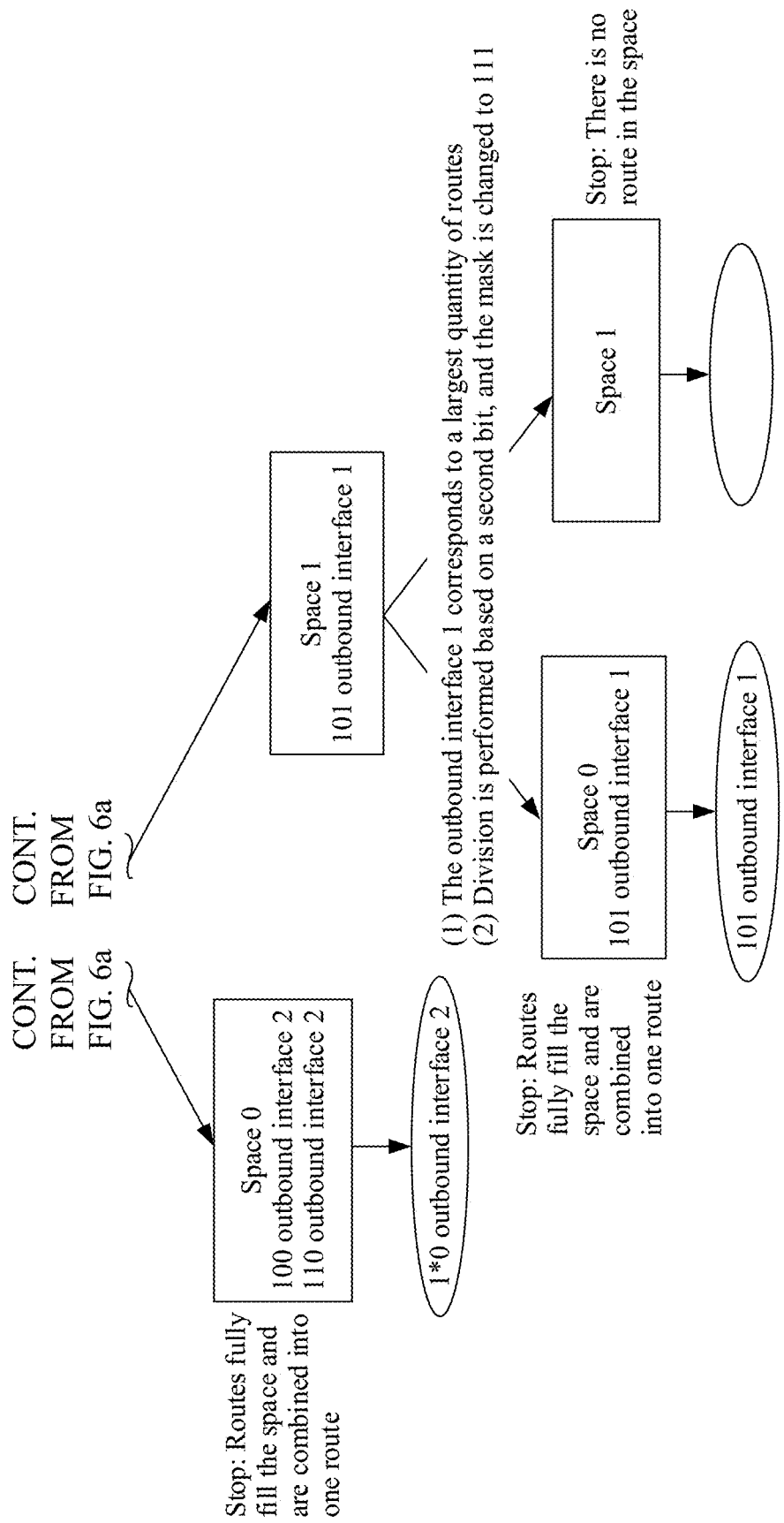

As shown in FIG. 6A and FIG. 6B, the space 0 includes four routing entries:
  route 000 corresponding to outbound interface 2;
  route 001 corresponding to outbound interface 2;

route 010 corresponding to outbound interface 2; and
route 011 corresponding to outbound interface 2.

S3: Determine whether both low-dimensional spaces obtained after the division meet the first condition, and if both meet the first condition, combine all routes that meet the first condition, to generate a second routing entry; and if a low-dimensional space does not meet the first condition, further divide the low-dimensional space until the first condition is met.

The first condition may be referred to as a stop condition or an export condition, and specifically includes the following two cases.

Case 1: All vertices in a plane of a low-dimensional space body obtained after the division are filled with routes, and the routes have a same outbound interface. The routes are combined into a common route and then exported.

Optionally, in a special case, for a lowest-dimensional space, entire routing space can be filled with only one host route, and therefore, the route is definitely exported.

Case 2: There is no route in a low-dimensional space body obtained after the division. That is, there is no route in the space, and the division is stopped for export.

As shown in FIG. 6a and FIG. 6b, after the three-dimensional space body is divided the first time, two geometric spaces: the space 0 and the space 1 are generated. The space 0 meets the case 1 of the first condition, and therefore may be combined into a second routing entry: route 0** corresponding to outbound interface 2.

Figure 5B:
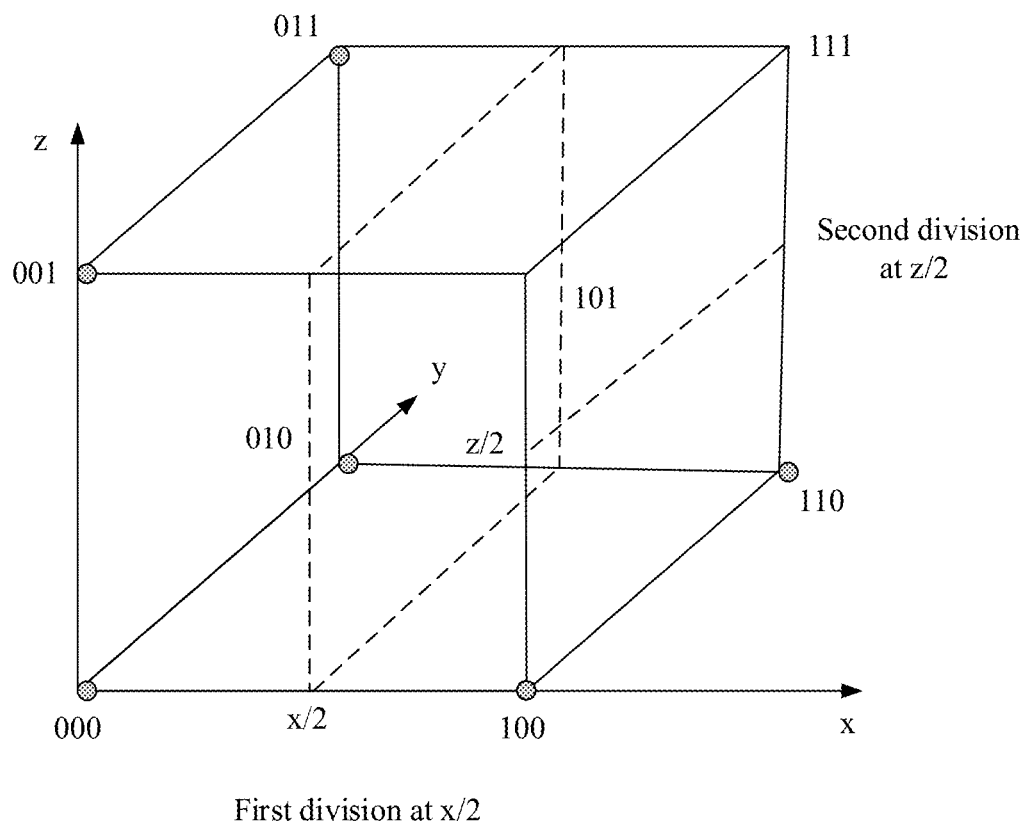
FIG. 5b is a schematic diagram of another axial division of a three-dimensional space body according to an embodiment of this application.

The space 1 does not meet the first condition, and therefore needs to be further divided, for example, divided based on a third bit. In this case, the mask is changed to 101, and a middle bit "0" in the mask indicates that content of a second bit of a destination address is unconcerned. A division method is shown in FIG. 5b. The division is performed along a position of a midpoint z/2 of the routes 100 and 101, and two low-dimensional spaces are obtained, as shown in Table 3:

TABLE 3

| Space 0 | Space 1 |
| --- | --- |
| route 100 corresponding to outbound interface 2 route 110 corresponding to outbound interface 2 | route 101 corresponding to outbound interface 1 |

The space 0 obtained after the division meets the case 1 of the first condition, and therefore, may be combined to generate a second routing entry: route 1*0 corresponding to outbound interface 2. "*" may replace "1" or "0". To be specific, a route 0** may refer to the route 000, the route 001, the route 010, or the route 011.

It is determined whether the other low-dimensional space, namely, the space 1, meets the first condition. Because the space 1 is not lowest-dimensional, the space 1 does not meet the first condition, and needs to be further divided to generate a space 0 (including "101 corresponding to outbound interface 1") and a space 1. The space 0 meets the case 1 of the first condition, and the space 1 meets the case 2 of the first condition (there is no route in the space). Therefore, a second routing entry "101 corresponding to outbound interface 1" may be obtained, as shown in FIG. 6a and FIG. 6b.

All second routing entries obtained after combining first routing entries that meet the first condition are as follows:
route 0** corresponding to outbound interface 2;
route 1*0 corresponding to outbound interface 2; and
route 101 corresponding to outbound interface 1.

Comparison between the first routing entries and the second routing entries respectively before and after the division and the combination is shown in Table 4.

TABLE 4

| First routing entry | Second routing entry |
| --- | --- |
| route 000 corresponding to outbound interface 2 | route 0** corresponding to outbound interface 2 |
| route 001 corresponding to outbound interface 2 | |
| route 010 corresponding to outbound interface 2 | |
| route 011 corresponding to outbound interface 2 | |
| route 100 corresponding to outbound interface 2 | route 1*0 corresponding to outbound interface 2 |
| route 110 corresponding to outbound interface 2 | |
| route 101 corresponding to outbound interface 1 | route 101 corresponding to outbound interface 1 |

Referring to Table 4, according to the method provided in this embodiment, there are seven first routing entries before the combination, and there are three routing entries after the combination. Therefore, storage space for storing four routing entries is saved.

TABLE 5

| Division policy | Quantity of original (first) routing entries | Quantity of combined (second) routing entries |
| --- | --- | --- |
| Optimal division based on a largest quantity of routes having a same outbound interface | 5613 | 2643 |
| Default division based on a bit sequence | 5613 | 3044 |

According to the method provided in this embodiment, the M first routing entries are combined to generate the N second routing entries, at least one of the N second routing entries includes a common route, and the common route may replace at least two routes in the M first routing entries, so that a quantity of first routing entries is significantly reduced, storage space of routing entries is saved, and the saved storage space can be used to store additional routing entries, thereby meeting a market requirement for a large capacity.

Optionally, in the foregoing process of dividing the n-dimensional space body, another method may alternatively be used for division, provided that the export condition is met after the division and a second routing entry can be generated through combination. Specific division methods are not limited in this application.

For example, for dividing the routing space of the three-dimensional space body into two space bodies at a time, there may be six division methods in total, including three division methods respectively along x, y, and z axes. As shown in FIG. 5a, the division methods may be referred to as axial division.

In this embodiment, the routing space is axially divided for the 3-bit routes, and there are three division methods in total. A space body including a 32-bit route has 32 axial directions, and each of 32 bits of a mask may represent one axis. Therefore, there are 32 division methods in total.

Figure 7:
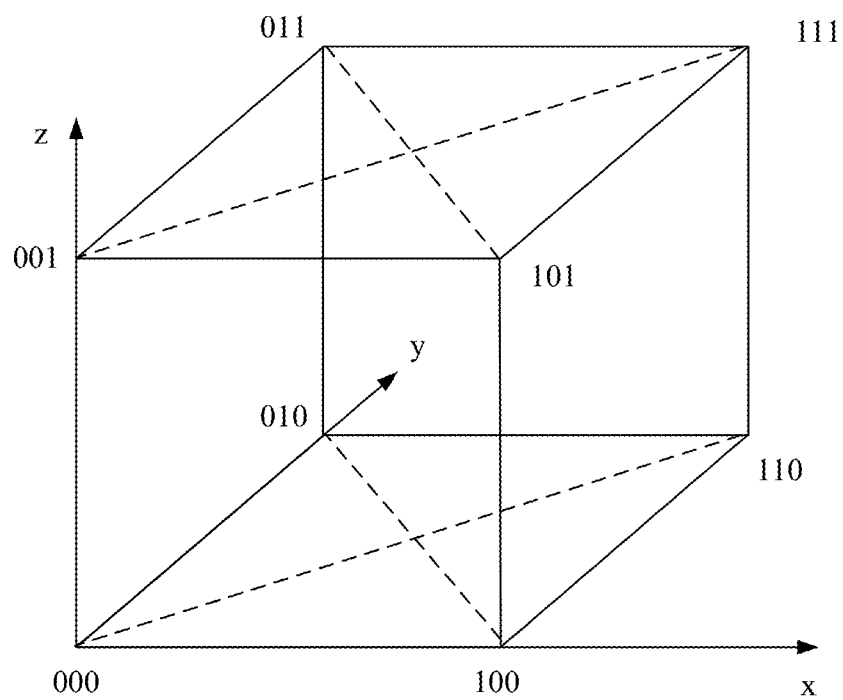
FIG. 7 is a schematic diagram of another division of a three-dimensional space body according to an embodiment of this application.

In addition, another division method, for example, a tangential division method, may be further included to divide routing entries. The method is to divide four routes in diagonals of a space body into a route set to form a space. As shown in FIG. 7, dashed lines represent four routes that are divided into a route set. Specifically, eight vertex routes may be divided based on diagonals into a space 0 including {000, 001, 111, 110} and a space 1 including {100, 101, 001, 010}. Then, it is further determined whether each space meets the first condition. If a space does not meet the first condition, the space body that does not meet the first condition is further divided. Finally, a common routing entry is obtained through combination.

In addition, in this application, the M first routing entries may alternatively be divided and combined by using another method. This is not limited in this embodiment of this application.

In another specific implementation of this embodiment, the method further includes: "adding" and "deleting" a routing entry in each space.

For example, in this embodiment, a process of deleting a routing entry from an n−1-dimensional space obtained after the division is described. A route "deleting" and combining process is as follows.

Step 1: Find a leaf node on which a to-be-deleted route is located.

Step 2: Check whether a space of the leaf node needs to be re-divided after the route is deleted. If the space needs to be re-divided, further divide the space.

Step 3: Check whether routes of an associated parent node can be combined after the division. If the routes of the associated parent node can be combined, combine the routes into a common route. If the routes of the associated parent node cannot be combined, check consistency with a division condition that is previously met. In a case of inconsistency, re-divide the routes.

Figure 8A:
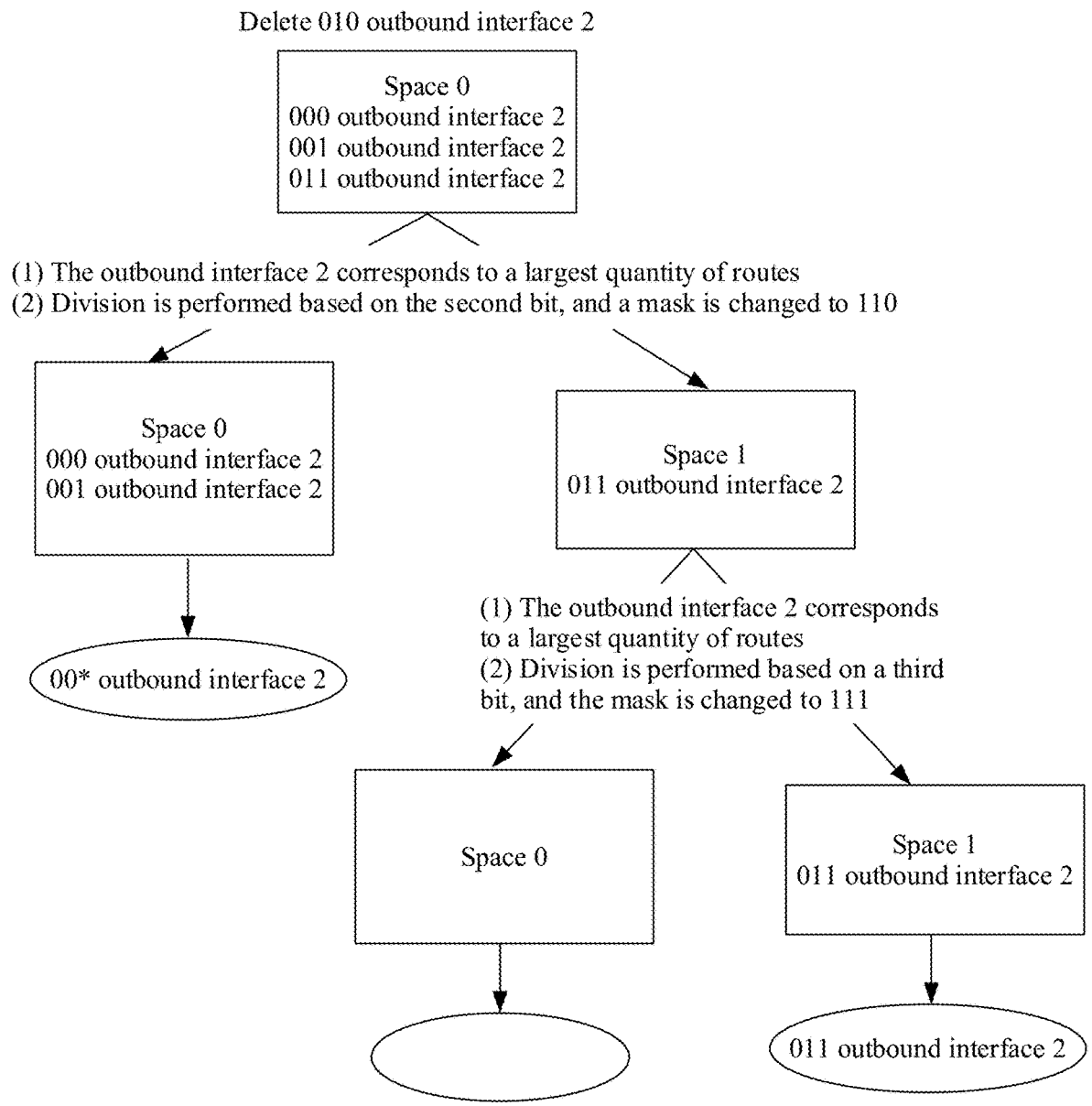
FIG. 8a is a schematic diagram of deleting a routing entry according to an embodiment of this application.

Specifically, as shown in FIG. 8a, the routing entry "route 010 corresponding to outbound interface 2" is deleted, and the following three routing entries included in the remaining "space 0" are obtained:

route 000 corresponding to outbound interface 2;
route 001 corresponding to outbound interface 2; and
route 011 corresponding to outbound interface 2.

Because a plane of a space body formed in the space 0 does not meet the condition that all vertices are filled with routes, in other words, it is inconsistent with the previous condition that all vertices in a first plane are filled with routes, the three routes in the space 0 need to be divided. A division rule may include that the outbound interface 2 corresponds to a largest quantity of routes; and division is performed based on a second bit, a mask 110 is obtained. Because IP address content of a third bit is unconcerned, a corresponding mask is 0.

A space 0 is obtained after the division, and includes the following two routing entries:

route 000 corresponding to outbound interface 2, and
route 001 corresponding to outbound interface 2.

The space 0 formed after the division meets that all vertices in a plane of a low-dimensional space body obtained after the division are filled with routes and the routes have a same outbound interface. Therefore, "route 000 corresponding to outbound interface 2" and "route 001 corresponding to outbound interface 2" are combined into a common routing entry: route 0** corresponding to outbound interface 2.

Similarly, because the other space "space 1" obtained after the division does not meet the export condition, the space 1 further needs to be divided to obtain two spaces: a space 0 and a space 1. Then, a remaining routing entry in the space 1 obtained through the new division meets the export condition, and a second routing entry "route 011 corresponding to outbound interface 2" is obtained.

Therefore, in the remaining space after "route 010 corresponding to outbound interface 2" is deleted, second routing entries that can be generated through combination are:

route 0** corresponding to outbound interface 2; and
route 011 corresponding to outbound interface 2.

Similarly, a process of re-dividing routes and generating second routing entries after "adding" a routing entry is the same as the steps of the method in the foregoing embodiment. A specific process includes as follows. First, a to-be-added route is inserted into a leaf node. Then, it is checked whether a routing space of the leaf node and a routing space associated with a parent node may be combined into a common route. If the two spaces may be combined, the two spaces are directly combined into a common route. If the two spaces cannot be combined, it is further checked whether a previous division condition is met. If the previous division condition is not met, routes are re-divided and combined.

Figure 8B:
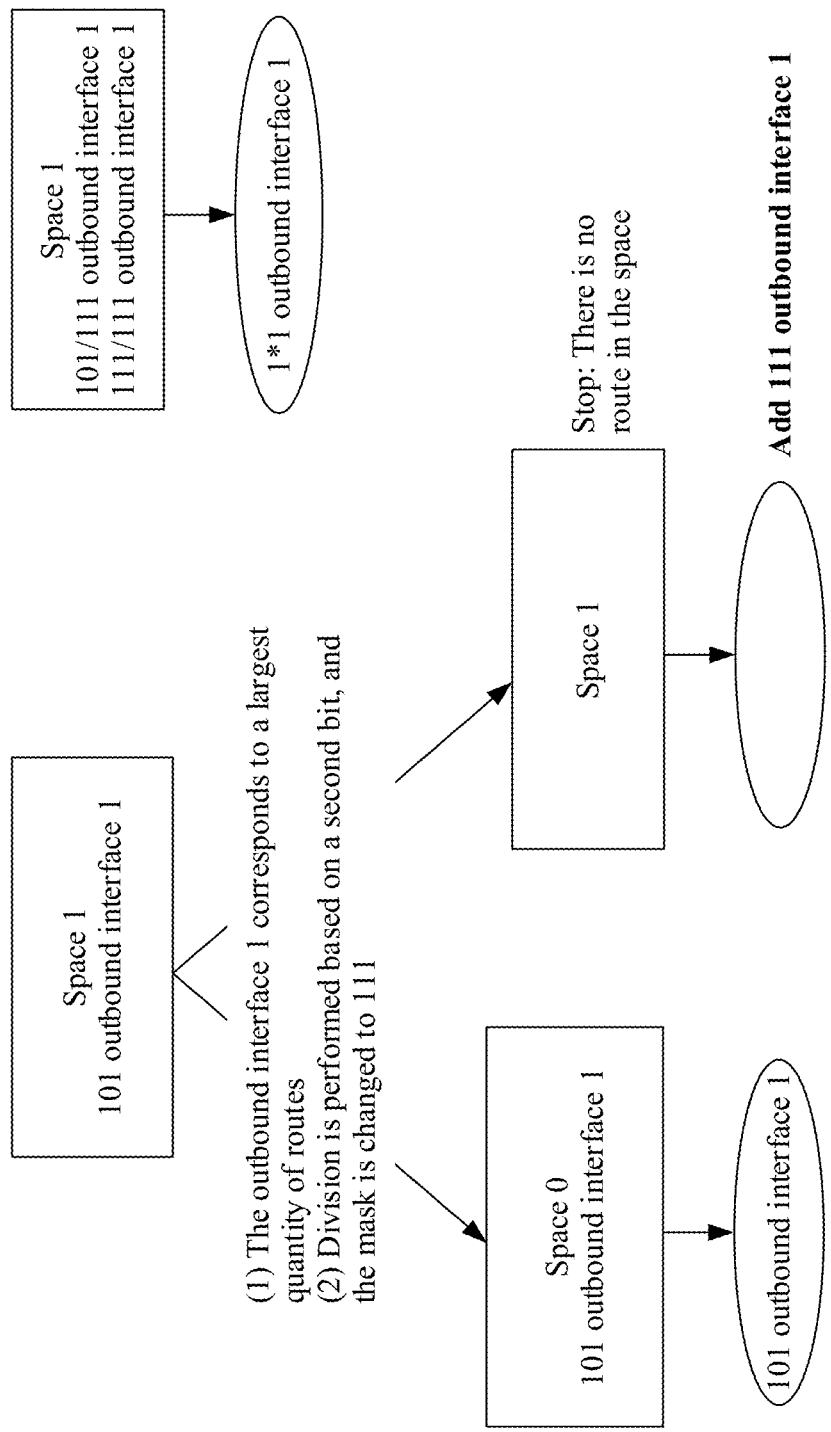
FIG. 8b is a schematic diagram of adding a routing entry according to an embodiment of this application.

For example, as shown in FIG. 8b, "route 111 corresponding to outbound interface 1" is added to the original routing table. First, the route is added to a leaf node. The leaf node may be in a bottom-layer "space 1". Then, it is detected whether the bottom-layer "space 1" and a "space 0" parallel to the bottom-layer "space 1" may be combined into a common route. In this embodiment, because "route 101 corresponding to outbound interface 1" in the space 0 and "route 111 corresponding to outbound interface 1" in the newly added space 1 may be combined, and fully occupies a space 1 of a parent node, a common route obtained after the combination is: route 1*1 corresponding to outbound interface 1.

In this embodiment, a first routing entry can be added and deleted freely, and routes can be quickly adjusted and combined by using the foregoing method, to form a new second routing entry.

It should be noted that, in the process of combining the plurality of first routing entries in the foregoing embodiment, a bit that may be replaced with "*" during combination may be any bit of a route, including but not limited to a last bit.

Figure 9:
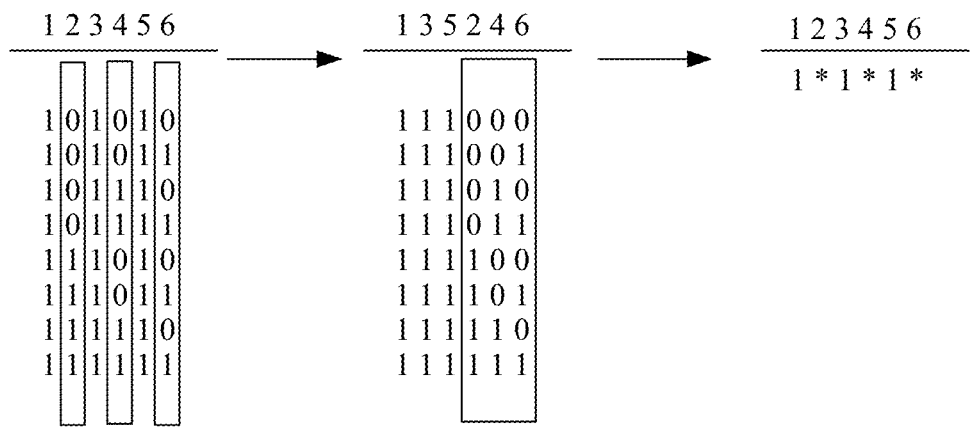
FIG. 9 is a schematic diagram of route combination according to an embodiment of this application.

For example, as shown in FIG. 9, eight 6-bit first routing entries are listed, and the eight first routing entries have a same outbound interface. In other words, the eight routes form a routing space. The eight routes are combined as follows. First, an axial division is performed based on a first bit. After the division, the remaining eight routes cannot fully fill a lower-dimensional space ($2^5=32$ routes are required to fill the entire space). That is, the first condition is not met, and a further division is required. Because all third bits of the eight routes are 1, the division is performed based on the third bits. After the division, the eight routes still cannot fully fill a lower-dimensional space ($2^4=16$ routes are required to fill the entire space), and a further division is performed. After the division is performed based on a fifth bit, an entire space is filled by eight routes ($2^3=8$ routes). In other words, the first condition is met. The generated eight routes are adjusted as follows: first bits, third bits, and fifth bits are put together, and are all 1; and remaining second bits, fourth bits, and sixth bits are all replaced with "*". A common route formed after combination is 1*1*1*.

In this embodiment, routes that have a bit combination possibility are divided into a route set as far as possible, and routes that do not meet the first condition are continuously removed, until remaining routes meet the first condition (all vertices in a plane of a low-dimensional space body obtained after a division are filled with routes having a same outbound interface), and a common routing entry is obtained through combination.

Figure 10:
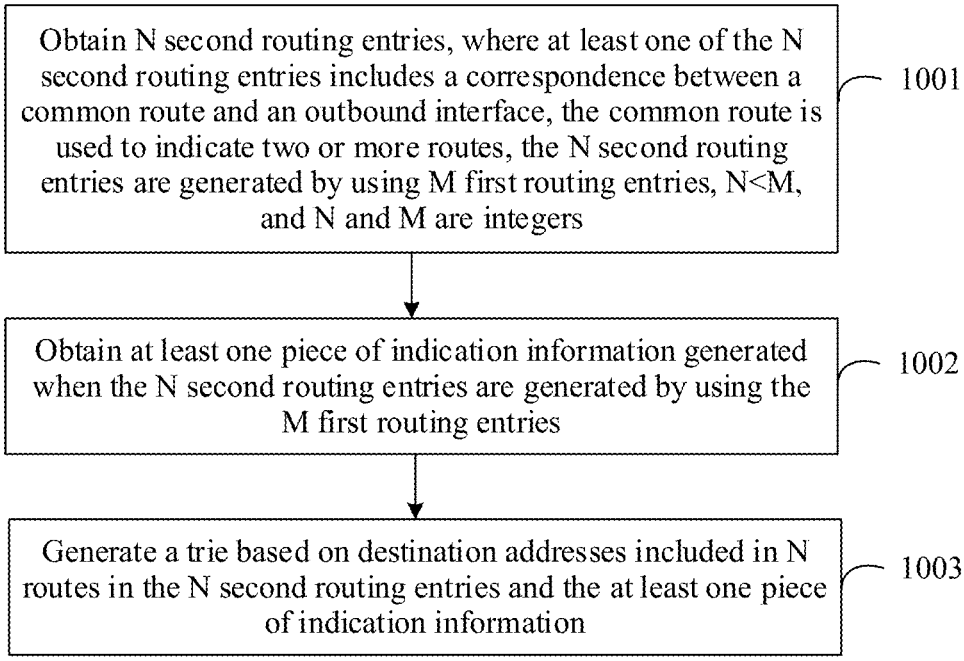
FIG. 10 is a flowchart of a trie generation method according to an embodiment of this application.

As shown in FIG. 10, an embodiment of this application further provides a trie generation method. The method may be applied to an apparatus/device receiving a FIB table, for example, an interface board or a line card box. In addition, the method may also be applied to an apparatus/device sending the FIB table, for example, a main control board or a server.

Further, the receiving apparatus/device generates a trie by using N second routing entries, and quickly searches for an outbound interface of a route based on the trie. Specifically, as shown in FIG. 10, the method includes the following steps.

Step 1001: Obtain N second routing entries, where at least one of the N second routing entries includes a correspondence between a common route and an outbound interface, the common route is used to indicate two or more routes, the N second routing entries are generated by using M first routing entries, N<M, and both N and M are positive integers.

Each route in the first routing entries includes a destination address and a mask corresponding to the destination address, both the destination address and the mask of each route are binary numbers, and a character included in the destination address is the same as a number 0/1 included in binary.

Step 1002: Obtain at least one piece of indication information generated when the N second routing entries are generated by using the M first routing entries.

For example, in the foregoing method embodiment, when 3-bit spatial routes are divided and combined, an original routing space including eight first routing entries is divided separately based on a first bit, a third bit, and a second bit, and finally, three second routing entries are generated through combination. In this process, the following three pieces of indication information may be included:

first indication information, used to indicate to divide, based on the first bit, the original routing space including the eight first routing entries, to form two routing spaces;

second indication information, used to indicate to divide, based on the third bit, a space including three remaining routes after the first division is performed, to form two further routing spaces, where one of the routing spaces includes one route; and third indication information, used to indicate to divide, based on the second bit, the space including one route, to generate two routing spaces. In this case, an export condition is met, and the division is stopped.

Step 1003: Generate a trie based on destination addresses included in N routes in the N second routing entries and the at least one piece of indication information.

The trie includes: a root node and at least one branch connected to the root node, each branch includes a plurality of leaf nodes, the root node and at least one leaf node are provided with indication information, the indication information is used to indicate a bit corresponding to a destination address of a next-layer branch of a node on which the indication information is located, and one node is provided with one piece of indication information.

Further, step 1003 of generating a trie based on destination addresses included in N routes in the N second routing entries and the at least one piece of indication information specifically includes: determining, based on the destination addresses included in the N routes, a bit corresponding to each character in the destination addresses; and configuring indication information used to indicate the bit corresponding to each character into a leaf node of an upper-layer branch or a root node that indicates a character of a destination address, to generate the trie.

In addition, a bottom-layer leaf node of the trie is further associated with an outbound interface.

Figure 11:
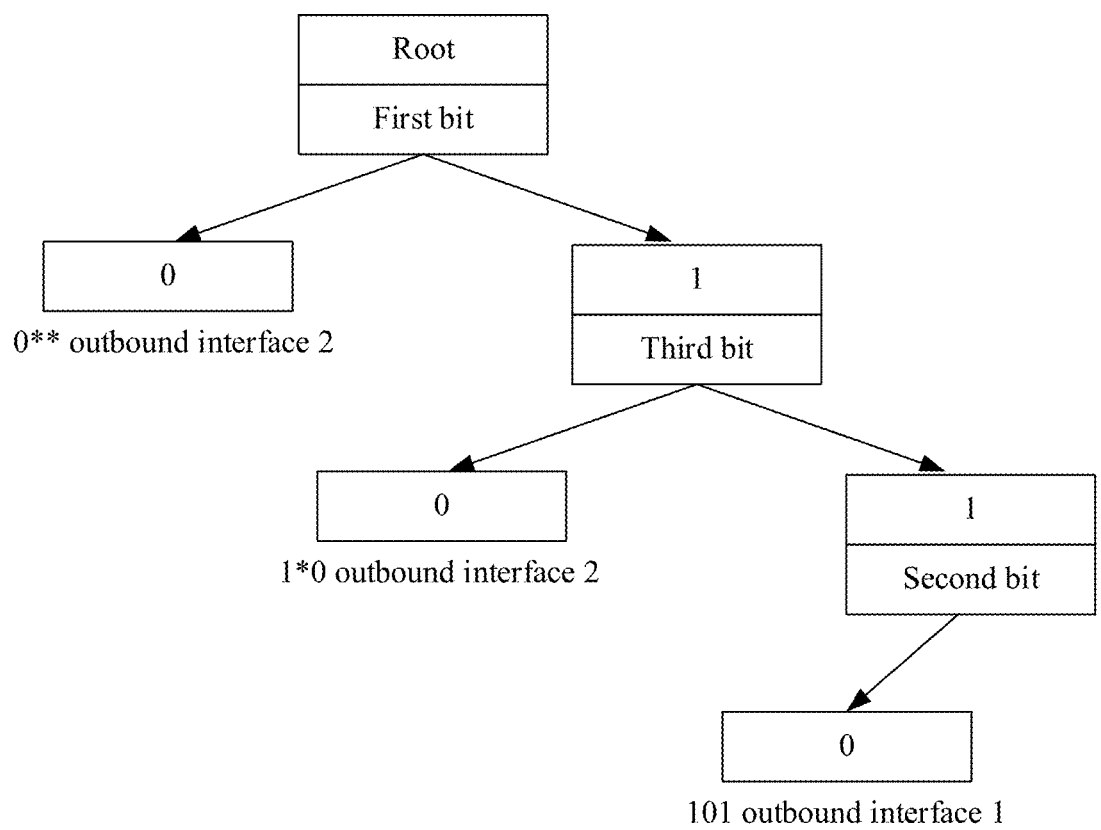
FIG. 11 is a schematic diagram of a trie according to an embodiment of this application.

Specifically, as shown in FIG. 11, in the foregoing embodiment of the routing entry generation method, the generated three routing entries are as follows: route 0** corresponding to outbound interface 2;

route 1*0 corresponding to outbound interface 2; and route 101 corresponding to outbound interface 1.

A FIB table is generated based on the three routing entries, and delivered to each interface board or line card box. The FIB table further includes the eight first routing entries combined into the three second routing entries, and further includes the following information: indication information corresponding to each destination address of each route in each first routing entry. For example, the first route 000 corresponds to the outbound interface 2, and bits are a first bit, a second bit, and a third bit; and in a process of combination to generate "route 0** corresponding to outbound interface 2", the route is divided based on the first bit, and a mask is 100, as shown in Table 6.

TABLE 6

| Second routing entry | Indication information |
| --- | --- |
| route 0** corresponding to outbound interface 2 | Division is performed based on a first bit |
| route 1*0 corresponding to outbound interface 2 | Division is performed based on a third bit |
| route 101 corresponding to outbound interface 1 | Division is performed based on a second bit |

Because a sequence needs to be set during storage and search of routing entries obtained after dimension-reduced combination, the trie needs to be constructed in a space division sequence. A division plane used during a space division corresponds to a bit of a route, and the trie is constructed based on the bit used in the division process.

As shown in FIG. 11, for example, a first space division is an axial direction based on a first bit, and therefore, indication information corresponding to the root (root) node of the trie is the first bit, and is used to indicate a bit of a destination IP address with which two branches (a space 0 and a space 1) connected to the root node are concerned. By analogy, for the following nodes, indication information of the third bit is configured in the space 1, to indicate a bit of a destination IP with which a next layer is concerned. A bit that is not indicated is represented by using "*", and "*" may be replaced with "1" or "0", to indicate two routes.

Similarly, indication information of the second bit is set in a next-layer space, to indicate that the second bit of the destination IP is 0, that is, the route 101.

In addition, referring to the trie constructed in FIG. 11, this embodiment further provides a route query method. Specifically, the method includes:

obtaining at least one route, where each route is represented by using a binary character "0/1";

performing search layer by layer for "0/1" of each route based on indication information configured in each node in the trie until all characters "0/1" in the route are traversed, and finding a last character "0" or "1"; and determining an outbound interface of the current route based on an outbound interface associated with the found last character "0" or "1".

Further, as shown in FIG. 11, an example of searching for an outbound interface of a route 101 is used, and a search method includes: determining a first bit of the route 101 based on indication information that is configured in a root node in the trie and that indicates a first bit; determining a third bit "1" in the route 101 based on indication information that is configured in a next-layer indication "1" of the root node and that indicates a third bit; and finally, based on indication information that is configured in the third bit and that indicates a second bit, determining that an outbound interface associated with the character "0" of the route 101 is 1, and determining that an outbound interface corresponding to the route 101 is 1.

Similarly, a method for searching for outbound interfaces of a route 0** and a route 1*0 is the same as the foregoing method. For example, for searching for the outbound interface of the route 0**, the indication information of the root node indicates the first bit, a corresponding character is "0", and last two bits are replaced with "*", and are unconcerned. Therefore, a found outbound interface corresponding to the character 0 is 2, and the outbound interface corresponding to the route 0** is 2.

According to the method provided in this embodiment, based on a trie constructed by using a bit used during each space division, each character of a route is compared with indication information configured in a root node or a leaf node in the trie. For example, if the indication information stored in the root node of the trie indicates a third bit, a third bit character of the searched route needs to be compared with information of two child nodes of the root node, and the search is performed layer by layer until all characters of the route are traversed, so that an outbound interface corresponding to each route can be quickly found.

Figure 12:
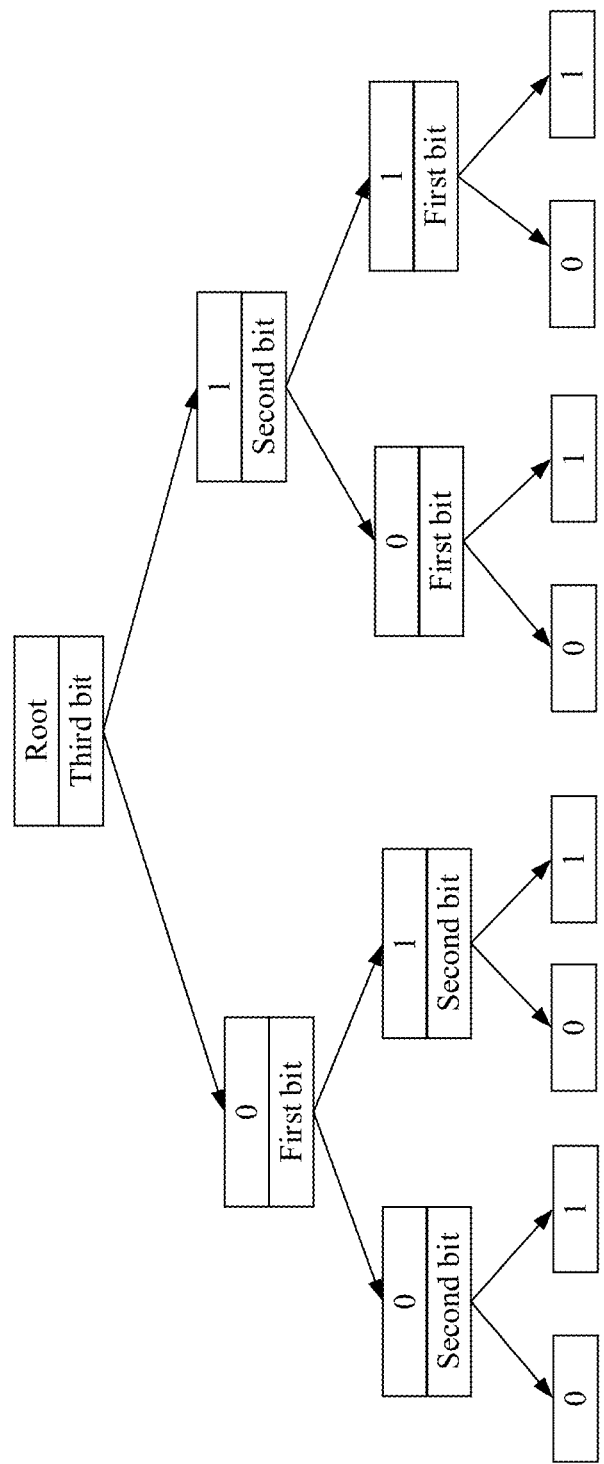
FIG. 12 is a schematic diagram of another trie according to an embodiment of this application.

In addition, in a structure of generating a trie based on the N second routing entries, another type of trie may be further included. For example, FIG. 12 shows a trie including indication information of all characters of a route. In the trie, each character "1/0" of each route corresponds to one piece of indication information to indicate a bit, and the bit indicated by the indication information may be any bit generated in the foregoing division process, including but not limited to a sequence of a first bit, a second bit, and a third bit. The trie indicates, starting from indication information configured in a root node and layer by layer, a bit of a destination IP address with which a next layer is concerned, until an outbound interface associated with a last leaf node.

According to the method provided in this embodiment, a trie including a routing entry including a common route is generated. Compared with an existing trie including all characters, the trie has fewer branches and fewer nodes, so that a line card box or an interface board that performs search can quickly find an outbound interface of a route without an off-chip memory, thereby reducing a forwarding delay.

Figure 13:
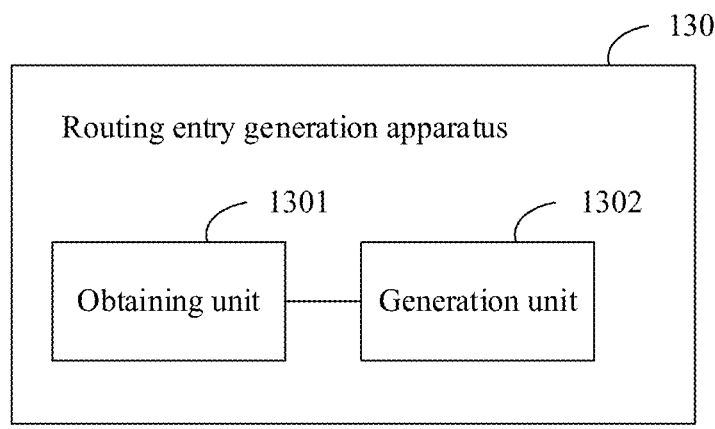
FIG. 13 is a schematic structural diagram of a routing entry generation apparatus according to an embodiment of this application.

FIG. 13 is a schematic structural diagram of a routing entry generation apparatus according to an embodiment of this application. The apparatus may be the server or the main control board in the foregoing embodiment, and is configured to implement the routing entry generation method in the foregoing embodiment.

As shown in FIG. 13, the routing entry generation apparatus 130 may include an obtaining unit 1301 and a generation unit 1302. In addition, the apparatus 130 may further include more or fewer components, for example, a sending unit and a storage unit. This is not limited in this application.

Further, the obtaining unit 1301 is configured to obtain M first routing entries, where each first routing entry includes a correspondence between a route and an outbound interface, and M≥2.

The generation unit 1302 is configured to combine the M first routing entries to generate N second routing entries, where at least one of the N second routing entries includes a correspondence between a common route and an outbound interface, the common route is used to indicate two or more routes, n<M, and both N and M are integers.

Optionally, in a specific implementation of this embodiment of this application, the route in the first routing entry includes a destination address and a mask corresponding to the destination address, and both the destination address and the mask of each route are binary numbers; and the generation unit 1302 is specifically configured to obtain a bit corresponding to each destination address of each route in the M first routing entries; and combine the M first routing entries based on a route set corresponding to an outbound interface with a largest quantity of routes and the bit corresponding to each destination address of each route, to generate the N second routing entries.

Optionally, in another specific implementation of this embodiment of this application, the generation unit 1302 is specifically configured to configure M routes in the M first routing entries on n vertices of a multi-dimensional space body, where M≤n; and divide the multi-dimensional space body based on the route set corresponding to the outbound interface with the largest quantity of routes in the M first routing entries and the bit corresponding to each destination address of each route until a first condition is met, to generate a plurality of low-dimensional space bodies, where the first condition is that all vertices in a plane of a low-dimensional space body obtained after the division are filled with routes having a same outbound interface, or there is no route in a low-dimensional space body obtained after the division.

The generation unit 1302 is further specifically configured to combine all first routing entries that meet the first condition, to generate the N second routing entries.

Optionally, in still another specific implementation of this embodiment of this application, the generation unit 1302 is specifically configured to determine a first plane of the multi-dimensional space body, where the first plane includes a largest quantity of routes having a same outbound interface; divide the multi-dimensional space body based on a bit of a destination address of each route having the same outbound interface in the first plane, to form a first space body and a second space body; determine whether both the first space body and the second space body meet the first condition; and stop the division if both meet the first condition, where the plurality of low-dimensional space bodies are the first space body and the second space body.

Optionally, in still another specific implementation of this embodiment of this application, the generation unit 1302 is further configured to: if neither meets the first condition, further divide the first space body and the second space body until all space bodies generated after the division meet the first condition, and generate the plurality of low-dimensional space bodies based on all the space bodies obtained after the division; and if a low-dimensional space body does not meet the first condition, divide the space body that does not meet the first condition until the first condition is met, to obtain the plurality of low-dimensional space bodies.

According to the apparatus provided in this aspect, the generation unit combines the M first routing entries into the N second routing entries, at least one of the N second routing entries includes a common route, and the common route may replace at least two routes in the M first routing entries, so that a quantity of first routing entries is significantly reduced, storage space of routing entries is saved, and the saved storage space can be used to store additional routing entries, thereby meeting a market requirement for a large capacity.

Figure 14:
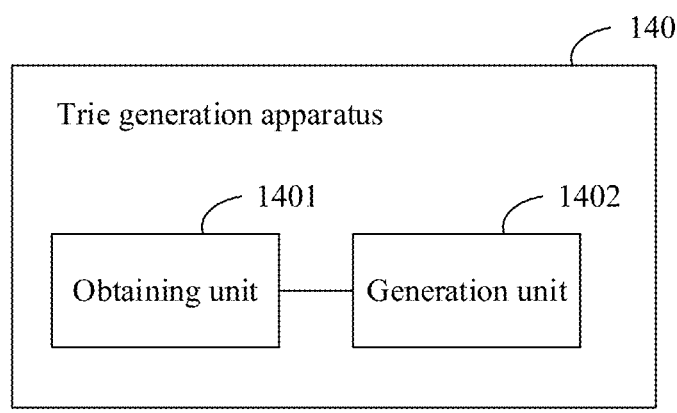
FIG. 14 is a schematic structural diagram of a trie generation apparatus according to an embodiment of this application.

FIG. 14 is a schematic structural diagram of a trie generation apparatus according to an embodiment of this application. The apparatus 140 is configured to implement the trie generation method in the foregoing embodiment.

Optionally, the apparatus 140 may be the line card box or the interface board in the foregoing embodiment.

As shown in FIG. 14, the apparatus 140 may include an obtaining unit 1401 and a generation unit 1402. In addition, the apparatus 140 may further include more or fewer components, for example, a sending unit and a storage unit. This is not limited in this application.

The obtaining unit 1401 is configured to obtain N second routing entries, where at least one of the N second routing entries includes a correspondence between a common route and an outbound interface, the common route is used to indicate two or more routes, the N second routing entries are generated by using M first routing entries, N<M, and both M and M are integers; and each route in the first routing entries includes a destination address and a mask corresponding to the destination address, and both the destination address and the mask of each route are binary numbers.

The obtaining unit 1401 is further configured to obtain at least one piece of indication information generated when the N second routing entries are generated by using the M first routing entries.

The generation unit 1402 is configured to generate a trie based on destination addresses included in N routes in the N second routing entries and the at least one piece of indication information, where the trie includes a root node and at least one branch connected to the root node, each branch includes a plurality of leaf nodes, the root node and at least one leaf node are provided with the indication information, and the indication information is used to indicate a bit corresponding to a destination address of a next-layer branch of a node on which the indication information is located.

Optionally, in a specific implementation of this embodiment of this application, the common route in the N second routing entries includes a common destination address and a mask, the common destination address includes several characters, and each character corresponds to one bit; and the generation unit 1402 is specifically configured to determine, based on the destination addresses included in the N routes, a bit corresponding to each character in the destination addresses; and configure indication information used to indicate the bit corresponding to each character into a leaf node of an upper-layer branch or a root node that indicates a character of a destination address, to generate the trie.

Optionally, in another specific implementation of this embodiment of this application, a last node of each branch in the trie is further associated with an outbound interface.

Figure 15:
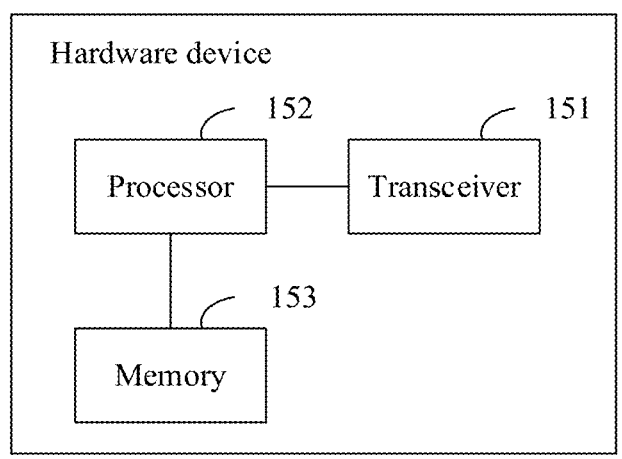
FIG. 15 is a schematic structural diagram of a hardware device according to an embodiment of this application.

Referring to FIG. 15, an embodiment of this application further provides a hardware device, configured to implement some or all steps of the routing entry generation method in the foregoing embodiment.

Optionally, the hardware device is a first device.

As shown in FIG. 15, the hardware device includes: a transceiver 151, a processor 152, and a memory 153. In addition, the hardware device may further include more or fewer components, or some components may be combined, or a different component deployment may be used. This is not limited in this application.

The processor 152, as a control center of the hardware device, is connected to parts of the entire router by using interfaces and lines, and runs or executes a software program and/or module stored in the memory 153 and retrieves data stored in the memory to perform functions of the hardware device.

The processor 152 may include an integrated circuit (IC), for example, may include a single packaged IC, or may include a plurality of packaged ICs that are connected and that have a same function or different functions. For example, the processor may include only a CPU, or may be a combination of a graphics processing unit (GPU), a digital signal processor (DSP), and a control chip in a transceiver module.

The transceiver 151 may include components such as a receiver, a transmitter, and an antenna, and is configured to receive or send a FIB table or a routing entry, establish a communication connection to an external network device, and perform data transmission.

Specifically, the transceiver 151 may include a communications module such as a wireless local area network (WLAN) module, a Bluetooth module, and a baseband module, and a radio frequency (RF) circuit corresponding to the communications module, to perform wireless local area network communication, Bluetooth communication, infrared communication, and/or cellular communications system. The transceiver module may support direct memory access.

In different implementations of this application, transceiver modules in the transceiver 151 generally appear as integrated circuit chips, and may be combined selectively, and not all of the transceiver modules and corresponding antenna groups are necessarily included. For example, the transceiver may include only a baseband chip, a radio frequency chip, and a corresponding antenna, to provide a communication function in a cellular communications system. The hardware device is connected to, for example, a wireless local area network or wideband code division multiple access (WCDMA) by using a wireless communication connection established by the transceiver module.

The memory 153 is configured to store program code for executing the technical solutions of this application under control of the processor 152. The processor 152 is configured to execute the program code stored in the memory 153, to implement the routing entry generation method in the foregoing embodiment.

Further, the memory 153 may be, but is not limited to, a read-only memory (ROM) or another type of static storage device capable of storing static information and instructions, a random access memory (RAM) or another type of dynamic storage device capable of storing information and instructions, an electrically erasable programmable read-only memory (EEPROM), a compact disc read-only memory (CD-ROM) or another compact disc storage, an optical disc storage (including a compact disc, a laser disc, an optical disc, a digital versatile disc, and a blue-ray disc, or the like), a magnetic disk storage medium or another magnetic storage device, or any other medium that can be used to carry or store expected program code in an instruction or data structure form and can be accessed by a computer. The memory may exist independently, or may be integrated into the processor.

Optionally, in a possible design, the device may be a server or a main control board, or may be another device that has a routing entry generation function.

For example, the device is a hardware device of the routing entry generation apparatus provided in the foregoing embodiment. Further, in the embodiment of the routing entry generation apparatus shown in FIG. 13 of this application, a function implemented by the obtaining unit 1301 may be implemented by the transceiver 151 of the device, or implemented by the processor 152 by controlling the transceiver 151; and a function implemented by the generation unit 1302 may be implemented by the processor 152 of the device.

Further, the memory 153 is configured to store a computer program product. The computer program product includes one or more computer instructions, for example, a routing entry generation instruction and a routing entry sending instruction. When the computer instruction is run on a computer, all or some procedures or functions of the routing entry generation method according to the foregoing embodiments of this application are generated.

The computer instruction may be stored in a computer-readable storage medium or may be transmitted from a computer-readable storage medium to another computer-readable storage medium. For example, the computer instruction may be transmitted from a network station, computer, server, or data center to another station, computer, or server in a wired or wireless manner. The computer-readable storage medium may be a magnetic disk, an optical disc, a read-only memory ROM, a random access memory RAM, or the like.

In addition, in this embodiment, the hardware device shown in FIG. 15 may alternatively be a device having a function of a trie generation apparatus and/or a routing entry query apparatus, for example, a second device, and is configured to implement the trie generation method and the routing entry query method in the foregoing embodiments.

Optionally, in a possible design, the hardware device may be a line card box or an interface board, or may be another device having such a function. This is not limited in this application.

For example, in the embodiment shown in FIG. 14 of this application, a function implemented by the obtaining unit 1401 may be implemented by the transceiver 151 of the hardware device in FIG. 15, or may be implemented by the processor 152 by controlling the transceiver 151; and a function implemented by the generation unit 1402 may be implemented by the processor 152 of the device.

Further, the memory 153 is configured to store a computer program product. The computer program product includes one or more computer instructions, for example, a trie generation instruction and an instruction for searching for an outbound interface of a route. When the computer instruction is run on a computer, all or some procedures or functions of the trie generation method and the routing entry query method according to the foregoing embodiments of this application are generated.

The computer instruction may be stored in a computer-readable storage medium or may be transmitted from a computer-readable storage medium to another computer-readable storage medium. For example, the computer instruction may be transmitted from a network station, computer, server, or data center to another station, computer, or server in a wired or wireless manner. The computer-readable storage medium may be a magnetic disk, an optical disc, a read-only memory ROM, a random access memory RAM, or the like.

In addition, an embodiment of this application provides a system, configured to implement some or all steps of the routing entry generation method and the trie generation method provided in the embodiments of this application.

The system includes the routing entry generation apparatus and the trie generation apparatus in the foregoing embodiments, or the system includes a first device and at least one second device. Further, the first device is a device that has a function of the routing entry generation apparatus in the foregoing embodiment, and the second device is a device that has a function of the trie generation apparatus in the foregoing embodiment.

Optionally, the first device and the second device may be separately deployed, or may be integrated. This is not limited in this embodiment of this application.

Optionally, in a specific implementation, the first device is a server or a main control board, and the second device is a line card box or an interface board.

Optionally, in a specific implementation, the system is a router, for example, a PB router.

Optionally, in a specific implementation, the system further includes at least one third device. The third device is a switching box. It may be understood that the system may further include another hardware device and component. This is not limited in this embodiment of this application.

In addition, the "unit" in the foregoing embodiments may be an application-specific integrated circuit (ASIC), a processor for executing one or more software or firmware programs, a memory, an integrated logical circuit, and/or another device that can provide the foregoing function.

A person skilled in the art may clearly understand that, the technologies in the embodiments of the present disclosure may be implemented by software plus a necessary general hardware platform. Based on such an understanding, the technical solutions in the embodiments of the present disclosure essentially, or the part contributing to the prior art may be implemented in a form of a software product. The computer software product may be stored in a storage medium, such as a ROM/RAM, a magnetic disk, or an optical disc, and includes several instructions for instructing a computer device (which may be a personal computer, a server, a network device, or the like) to perform the methods described in the embodiments or some of the embodiments of the present disclosure.

For same or similar parts in the embodiments in this specification, refer to the embodiments. Particularly, the embodiments of the routing entry generation apparatus and the trie generation apparatus are basically similar to the method embodiments, and therefore are described briefly. For related parts, refer to the descriptions in the method embodiments.

In addition, in the descriptions of this application, "plurality of" means two or more than two unless otherwise specified. In addition, to clearly describe the technical solutions in the embodiments of this application, terms such as "first" and "second" are used in the embodiments of this application to distinguish between same items or similar items that have basically the same functions or purposes. A person skilled in the art may understand that the terms such as "first" and "second" do not limit a quantity or an execution sequence, and the terms such as "first" and "second" do not indicate a definite difference.

The foregoing descriptions are implementations of this application, but are not intended to limit the protection scope of this application.

What is claimed is:

1. A method performed by a router having a main control board and multiple interface boards, comprising:
obtaining, by the main control board, a first routing table having M first routing entries, wherein each first routing entry comprises a correspondence between a route and an outbound interface, M≥2, and M is an integer;
combining, by the main control board, the M first routing entries in the first routing table to generate N second routing entries of a target routing table, wherein at least one routing entry in the target routing table is formed by combining two or more routing entries in the first routing table and comprises a correspondence between a common route and an outbound interface, the common route is used to indicate corresponding routes of said two or more routing entries of the first routing table, N<M, and N is an integer; and
delivering, by the main control board, the target routing table to each of the interface boards for use by said each interface board to route packets.

2. The method according to claim 1, wherein each the route in the first routing entry comprises a destination address and a mask corresponding to the destination address, and both the destination address and the mask of the route are binary numbers; and
wherein the step of combining the M first routing entries in the first routing table to generate the N second routing entries of the target routing table comprises:
obtaining a bit corresponding to each destination address of each route in the M first routing entries; and
combining the M first routing entries based on a route set corresponding to an outbound interface with a largest quantity of routes and the bit corresponding to each destination address of each route, to generate the N second routing entries.

3. The method according to claim 2, wherein the combining the M first routing entries based on the route set corresponding to the outbound interface with the largest quantity of routes and the bit corresponding to each destination address of each route, to generate the N second routing entries comprises:
configuring M routes in the M first routing entries on n vertices of a multi-dimensional space body, wherein M≤n;
dividing the multi-dimensional space body based on the route set corresponding to the outbound interface with the largest quantity of routes in the M first routing entries and the bit corresponding to each destination address of each route until a first condition is met, to generate a plurality of low-dimensional space bodies, wherein the first condition is that all vertices in a plane of a low-dimensional space body obtained after the division are filled with routes having a same outbound interface, or there is no route in a low-dimensional space body obtained after the division; and
combining all first routing entries that meet the first condition, to generate the N second routing entries.

4. The method according to claim 3, wherein the dividing the multi-dimensional space body until the first condition is met, to generate the plurality of low-dimensional space bodies comprises:
determining a first plane of the multi-dimensional space body, wherein the first plane comprises a largest quantity of routes having a same outbound interface;
dividing the multi-dimensional space body based on a bit of a destination address of each route having the same outbound interface in the first plane, to form a first space body and a second space body;
determining whether both the first space body and the second space body meet the first condition; and
stopping the division if both meet the first condition, wherein the plurality of low-dimensional space bodies are the first space body and the second space body.

5. The method according to claim 4, further comprising:
if neither meets the first condition, further dividing the first space body and the second space body until all space bodies generated after the division meet the first condition, and generating the plurality of low-dimensional space bodies based on all the space bodies obtained after the division; and
if a low-dimensional space body does not meet the first condition, dividing the space body that does not meet the first condition until the first condition is met, to obtain the plurality of low-dimensional space bodies.

6. A method performed by a router having a main control board and multiple interface boards, comprising:
obtaining, by the main control board, N second routing entries of a target routing table, wherein at least one routing entry of the N second routing entries comprises a correspondence between a common route and an outbound interface, the common route is used to indicate routes of two or more routing entries of a first routing table, the N second routing entries are generated by combining M first routing entries of the first routing table, M≥2, N<M, and both N and M are integers; and each route in the first routing entries comprises a destination address and a mask corresponding to the destination address, and both the destination address and the mask of each route are binary numbers;
obtaining, by the main control board, at least one piece of indication information generated when the N second routing entries are generated by using the M first routing entries;
generating, by the main control board, a trie based on destination addresses comprised in N routes in the N second routing entries and the at least one piece of indication information, wherein the trie comprises a root node and at least one branch connected to the root node, each branch comprises a plurality of leaf nodes, the root node and at least one leaf node are provided with the indication information, and the indication information is used to indicate a bit corresponding to a destination address of a next-layer branch of a node on which the indication information is located; and
delivering, by the main control board, the target routing table to each of the multiple interface boards for use by said each interface board to route packets.

7. The method according to claim 6, wherein the generating the trie based on the destination addresses comprised in the N routes in the N second routing entries and the at least one piece of indication information comprises:
determining, based on the destination addresses comprised in the N routes, a bit corresponding to each character in the destination addresses; and
configuring indication information used to indicate the bit corresponding to each character into a leaf node of an upper-layer branch or a root node that indicates a character of a destination address, to generate the trie.

8. A router comprising:
a main control board; and
multiple interface boards;

wherein the main control board is configured to:
obtain a first routing table having M first routing entries, wherein each first routing entry comprises a correspondence between a route and an outbound interface, M≥2, and M is an integer;
combine the M first routing entries of the first routing table to generate N second routing entries of a target routing table, wherein at least one routing entry of the target routing table is formed by combining two or more routing entries of the first routing table and comprises a correspondence between a common route and an outbound interface, the common route is used to indicate routes of said two or more routing entries of the first routing table, N<M, and N is an integer; and
delivering, by the main control board, the target routing table to each of the interface boards for use by said each interface board to route packets.

9. The router according to claim 8, wherein each the route in the first routing entry comprises a destination address and a mask corresponding to the destination address, and both the destination address and the mask of the route are binary numbers; and
wherein the main control board is configured to obtain a bit corresponding to each destination address of each route in the M first routing entries; and combine the M first routing entries based on a route set corresponding to an outbound interface with a largest quantity of routes and the bit corresponding to each destination address of each route, to generate the N second routing entries.

10. The router according to claim 9, wherein:
the main control board is configured to configure M routes in the M first routing entries on n vertices of a multi-dimensional space body, wherein M≤n; and divide the multi-dimensional space body based on the route set corresponding to the outbound interface with the largest quantity of routes in the M first routing entries and the bit corresponding to each destination address of each route until a first condition is met, to generate a plurality of low-dimensional space bodies, wherein the first condition is that all vertices in a plane of a low-dimensional space body obtained after the division are filled with routes having a same outbound interface, or there is no route in a low-dimensional space body obtained after the division; and
combine all first routing entries that meet the first condition, to generate the N second routing entries.

11. The router according to claim 10, wherein
the main control board is configured to determine a first plane of the multi-dimensional space body, wherein the first plane comprises a largest quantity of routes having a same outbound interface; divide the multi-dimensional space body based on a bit of a destination address of each route having the same outbound interface in the first plane, to form a first space body and a second space body; determine whether both the first space body and the second space body meet the first condition; and stop the division if both meet the first condition, wherein the plurality of low-dimensional space bodies are the first space body and the second space body.

12. The router according to claim 11, wherein the main control board is further configured to:
if neither meets the first condition, further divide the first space body and the second space body until all space bodies generated after the division meet the first condition, and generate the plurality of low-dimensional space bodies based on all the space bodies obtained after the division; and
if a low-dimensional space body does not meet the first condition, divide the space body that does not meet the first condition until the first condition is met, to obtain the plurality of low-dimensional space bodies.

13. The method according to claim 1, wherein:
the route in the first routing entry comprises a destination address and a mask corresponding to the destination address, and both the destination address and the mask of the route are binary numbers;
the binary numbers of the mask indicate a degree of concern for the destination address; and
concerned content of the destination address is retained, and unconcerned content of the destination address is replaced with a symbol.

14. The method according to claim 6, wherein the trie indicates, starting from indication information configured in a root node and layer by layer, a bit of a destination IP address with which a next layer is concerned, until an outbound interface associated with a last leaf node.

* * * * *